United States Patent
Kershner et al.

[11] Patent Number: 5,838,262
[45] Date of Patent: Nov. 17, 1998

[54] AIRCRAFT VIRTUAL IMAGE DISPLAY SYSTEM AND METHOD FOR PROVIDING A REAL-TIME PERSPECTIVE THREAT COVERAGE DISPLAY

[75] Inventors: Stuart D. Kershner, Naugatuck; Frank W. Warburton, Newton, both of Conn.

[73] Assignee: Sikorsky Aircraft Corporation, Stratford, Conn.

[21] Appl. No.: 769,909

[22] Filed: Dec. 19, 1996

[51] Int. Cl.$^6$ .................................................. G08B 21/00
[52] U.S. Cl. .......................... 340/945; 340/961; 340/973; 340/980; 340/995; 342/65; 701/207; 701/300; 701/301; 701/302
[58] Field of Search ..................... 340/945, 961, 340/988, 995, 973, 980; 364/443, 460, 461, 424.06, 424.012, 449.2; 342/63, 64, 65; 395/118, 119, 125, 127; 701/300, 301, 302, 207

[56] References Cited

U.S. PATENT DOCUMENTS

| | | | |
|---|---|---|---|
| Re. 28,847 | 6/1976 | Vizenor | 359/631 |
| 3,923,370 | 12/1975 | Mostrom | 359/630 |
| 3,983,474 | 9/1976 | Kuipers | 324/207.18 |
| 4,017,858 | 4/1977 | Kuipers | 342/350 |
| 4,269,476 | 5/1981 | Gauthier et al. | 345/8 |
| 4,305,507 | 12/1981 | Wittkopf | 209/3 |
| 4,439,157 | 3/1984 | Breglia et al. | 434/40 |
| 4,439,775 | 3/1984 | Johnson | 347/14 |
| 4,446,480 | 5/1984 | Breglia et al. | 348/115 |
| 4,646,244 | 2/1987 | Bateman et al. | 364/461 |
| 4,823,271 | 4/1989 | Clark et al. | 364/443 |
| 4,947,350 | 8/1990 | Murray et al. | 364/554 |
| 5,072,218 | 12/1991 | Spero et al. | 340/980 |
| 5,179,638 | 1/1993 | Dawson et al. | 395/125 |
| 5,296,854 | 3/1994 | Hamilton et al. | 340/980 |
| 5,381,338 | 1/1995 | Wysocki et al. | 364/449.1 |
| 5,448,233 | 9/1995 | Saban et al. | 340/963 |
| 5,526,260 | 6/1996 | Kodet et al. | 364/423 |
| 5,631,640 | 5/1997 | Deis et al. | 340/961 |

*Primary Examiner*—Jeffery A. Hofsass
*Assistant Examiner*—Benjamin C. Lee
*Attorney, Agent, or Firm*—Terrance J. Radke

[57] ABSTRACT

A virtual image display system for aircraft is operative to identify threat systems that are proximal the flight path of an aircraft when the aircraft is within the threat range of such threat systems. The virtual image display system is further operative to generate three-dimensional threat envelopes of identified threat systems and to display real-time perspective video images of such three-dimensional threat envelopes for viewing by the pilot.

24 Claims, 16 Drawing Sheets

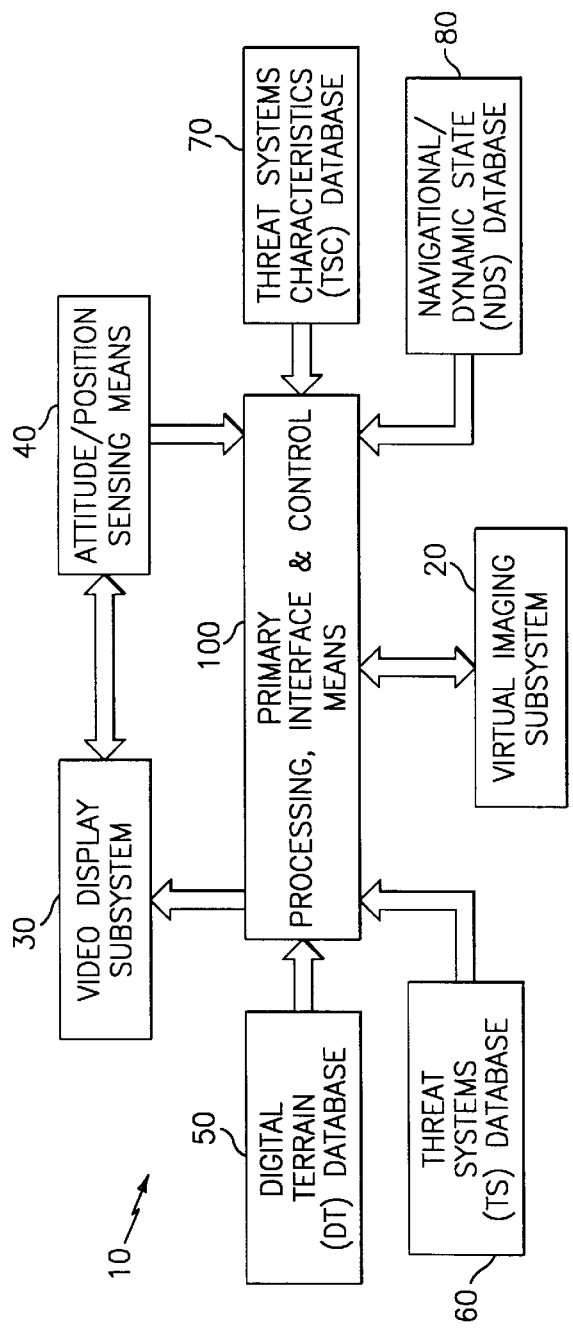
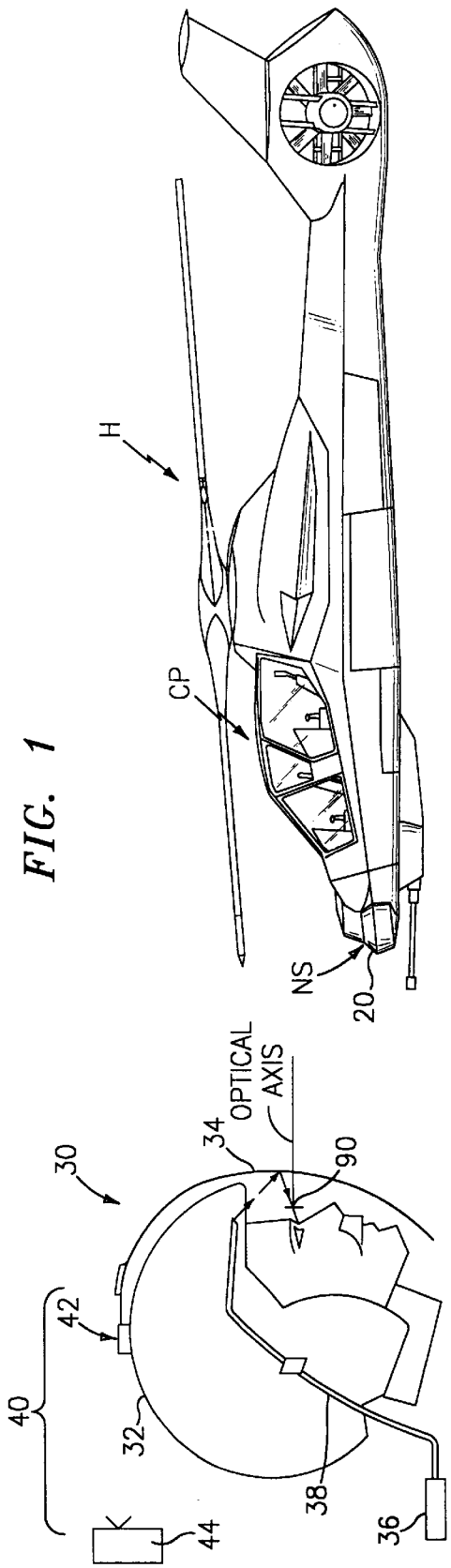
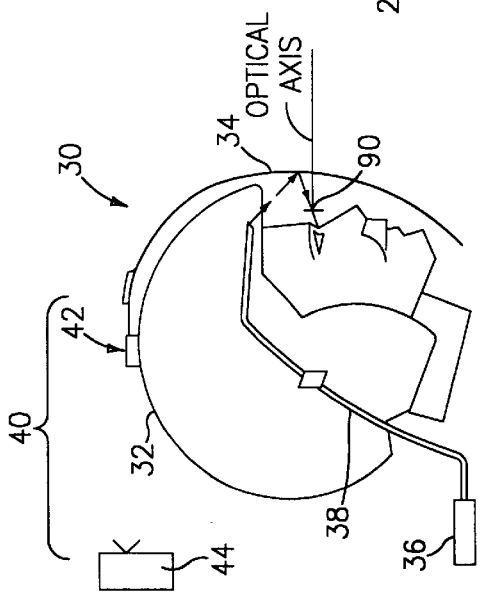

| THREAT SYSTEM | TS-1 | TS-2 | TS-3 | TS-4 |
|---|---|---|---|---|
| CODE DESIGNATION | 256 (NATO) | SA-15 (NATO) | SA-17 (NATO) | SA-18 (NATO) |
| COORDINATES | LAT | LAT | LAT | LAT |
| | LONG | LONG | LONG | LONG |
| ELEVATION | EL (MSL) | EL (MSL) | EL (MSL) | EL (MSL) |

*FIG. 5A*

| THREAT SYSTEM | TS-1 | TS-2 | TS-3 | TS-4 |
|---|---|---|---|---|
| RADAR, SEARCH (Op. Freq./Range) | Op. Freq. | Op. Freq. | Op. Freq. | Op. Freq. |
| | NM | NM | NM | NM |
| RADAR, TRACKING (Op. Freq./Range) | Op. Freq. | Op. Freq. | Op. Freq. | Op. Freq. |
| | NM | NM | NM | NM |
| INTERCEPT RANGE | NM | NM | NM | NM |
| DETECTION PHASE (sec) | 10 | 12 | 12 | 12 |
| ACQUISITION PHASE (sec) | 4 | 15 | 15 | 10 |
| WEAPONS RELEASE PHASE (sec) | 6 | 3 | 8 | 3 |
| TOTAL RESPONSE TIMELINE (sec) | 20 | 30 | 35 | 25 |

*FIG. 5B*

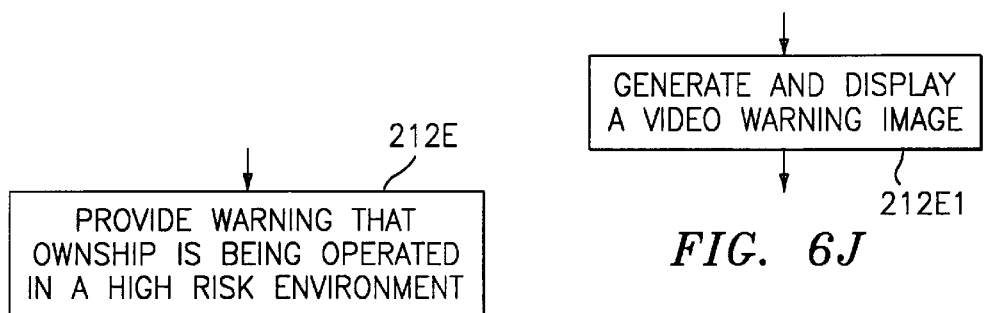
FIG. 6J
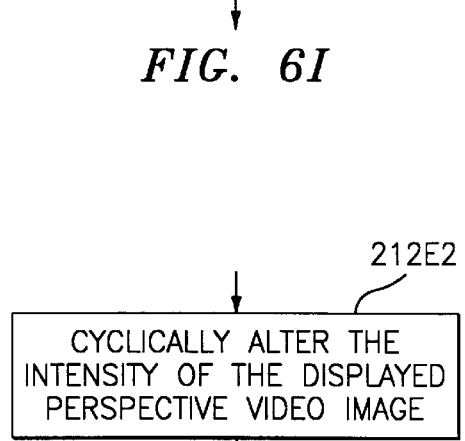
FIG. 6I
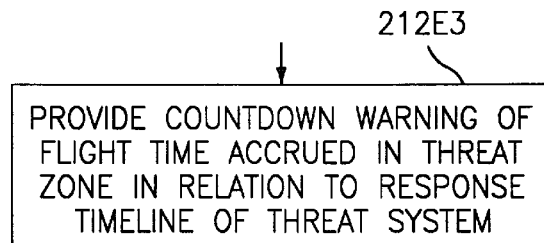
FIG. 6L
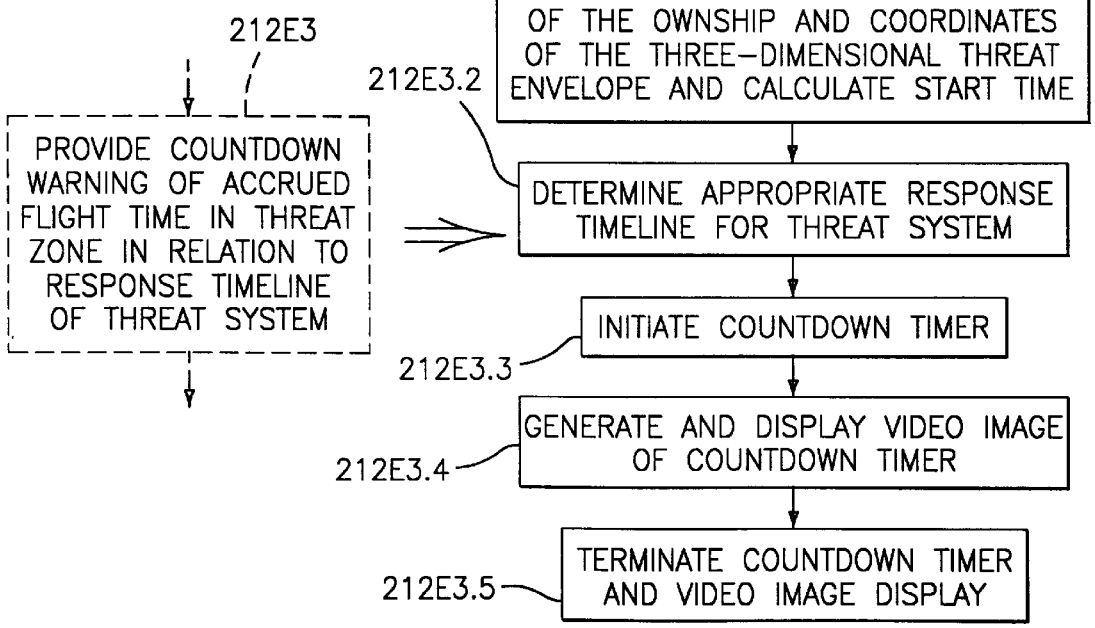
FIG. 6K
FIG. 6M

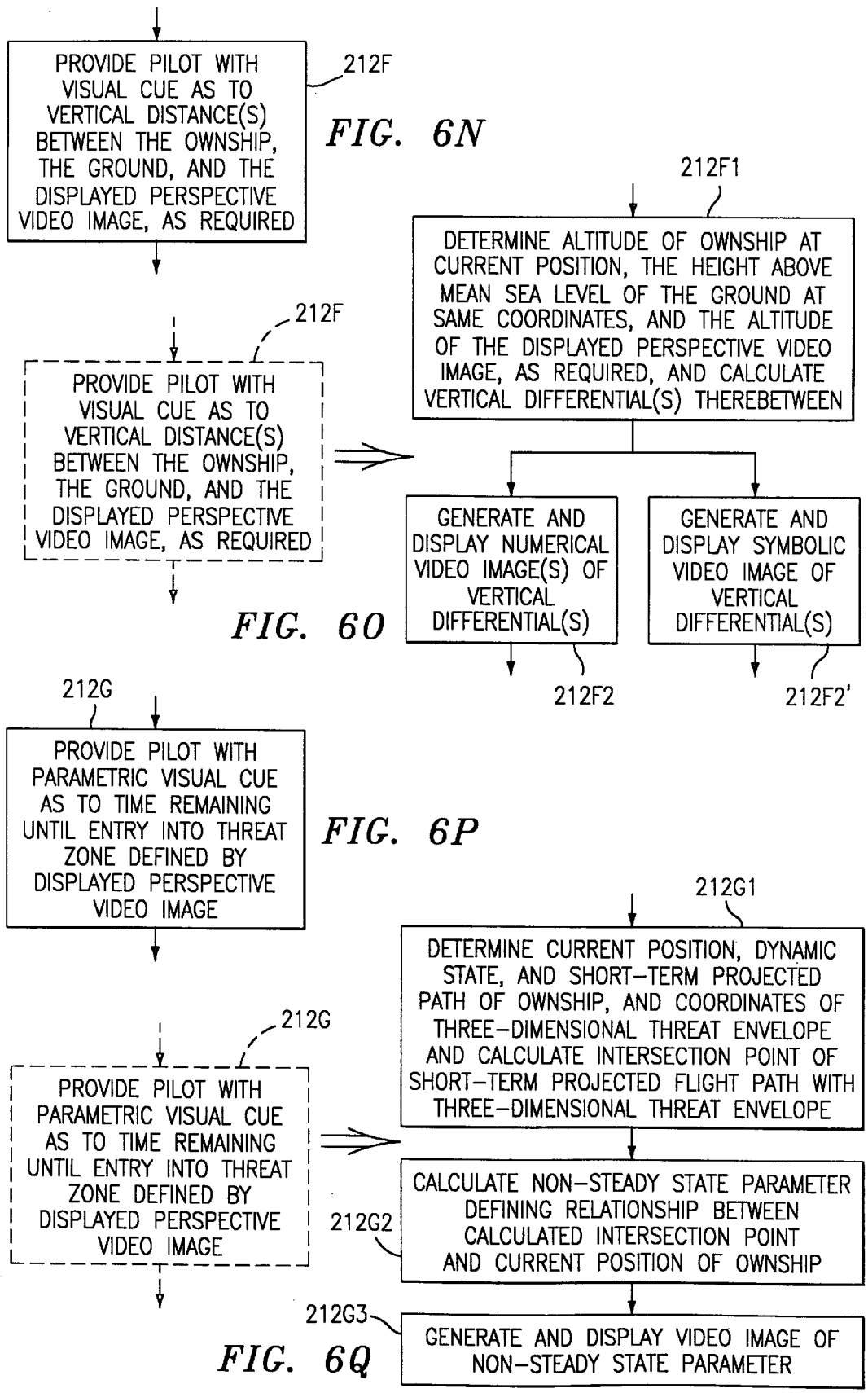

AIRCRAFT VIRTUAL IMAGE DISPLAY SYSTEM AND METHOD FOR PROVIDING A REAL-TIME PERSPECTIVE THREAT COVERAGE DISPLAY

TECHNICAL FIELD

The present invention relates to aircraft display systems, and more particularly, to an aircraft virtual image display system that provides real-time perspective video images of the threat envelopes of nearby threat systems such as surface-to-air and/or air-to-air weapon subsystems for viewing by the pilot.

BACKGROUND OF THE INVENTION

The safe pilotage and operation of aircraft requires that pilots maintain a continual situational awareness of the status of aircraft subsystems, the aircraft flight path, and the external environment in the vicinity of the aircraft flight path. This requirement imposes a high workload on the typical pilot, and this workload is significantly exacerbated for pilots operating current generation military aircraft, particularly in a hostile environment.

Current generation aircraft are complex, sophisticated systems comprised of a large number of interrelated subsystems such as the airframe, powerplant, flight controls, avionics, navigation equipment, armaments, etc. Such subsystems generate voluminous amounts of status data and information that must be continually monitored and assimilated by the pilot for the safe and efficient pilotage and operation of such aircraft.

Flight operations in today's crowded skies require that pilots maintain a constant situational awareness of: (i) the aircraft attitude and position; and (ii) elements of the external environment in the immediate vicinity of the aircraft flight path. For pilots operating military aircraft, the situational awareness requirement is aggravated by high pilot workload flight operations such as low level, nap-of-the-earth (NOE), adverse weather, and/or night flying. The workload of military pilots is further aggravated when aircraft flight operations are conducted in a hostile environment.

Electro-optical display subsystems have been developed for military aircraft to optimize the pilot's ability to maintain a constant situational awareness of status data and information with respect to aircraft subsystems, the attitude/position of the aircraft, and elements of the external environment in the vicinity of the aircraft flight path. Current aircraft electro-optical display subsystems include helmet-mounted display (HMD) subsystems, head-up display (HUD) subsystems, and flat-panel (two-dimensional) display subsystems mounted in cockpit panels. These electro-optical display subsystems are effective, to varying degrees, in simultaneously coupling status data and information to the pilot with respect to: (i) aircraft subsystems; (ii) aircraft attitude/position; and (iii) elements of the external environment in the vicinity of the aircraft flight path. HMD subsystems are generally the most effective while flat-panels are generally the least effective for simultaneously coupling such status data and information to the pilot. Representative examples of HMD and HUD subsystems are illustrated in U.S. Pat. Nos. 4,446,480, 4,439,775, 4,439,157, 4,305,507, 4,269,476, and 3,923,370.

The operation of military aircraft in a hostile environment poses an additional challenge with respect to the requirement that the pilot maintain a constant situational awareness of: (i) aircraft subsystems; (ii) aircraft attitude/position; and elements of the external environment in the vicinity of the aircraft flight path. Hostile environments, by definition, include threat systems such as surface-to-air and/or air-to-air weapon subsystems. The presence of such threat systems in the vicinity of the aircraft flight path poses a real-time active danger to such aircraft, and, it is, therefore, of paramount importance that the pilots of aircraft operating in such a hostile environment be provided with continual status data and information, in a pertinent, effective format, with respect to such threat systems.

While it is known in the prior art to provide real-time visual displays of the geographic areas of coverage associated with nearby threat systems, given intelligence (or sensor) information on the locations and types of such threat systems, such visual displays have heretofore been limited to presentation by means of the cockpit flat-panel display subsystems. That is, such visual displays only provide two-dimensional information concerning the geographic areas of coverage of such threat systems. While this rudimentary level of information is useful to the pilot, it is generally less than sufficient for aircraft flight operations wherein the aircraft is engaged in low level or NOE flight profiles in the vicinity of such threat systems. And, as noted above, flat-panel display subsystems are the least effective of the various aircraft electro-optical display subsystems in coupling situational data and information, with respect to: (i) aircraft subsystems, (ii) aircraft attitude/position, and (iii) elements of the external environment in the immediate vicinity of the aircraft, to the pilot in manner that facilitates rapid and unambiguous assimilation thereof.

A need exists to provide a system and method for aircraft that is operative to identify threat systems that are proximal the flight path of an aircraft wherein the aircraft is within the threat range of such threat systems. The system and method should also possess the capability to generate real-time three-dimensional threat envelopes of identified threat systems and to display perspective video images of such threat envelopes for viewing by the pilot in a pertinent, effective manner that facilitates rapid and unambiguous assimilation thereof by pilots of aircraft operating in hostile environments.

DISCLOSURE OF THE INVENTION

One object of the present invention is to provide a virtual image display system and method for aircraft that is operative to identify threat systems that are proximal the flight path of an aircraft when the aircraft is within a threat range of such threat systems.

Another object of the present invention is to provide a virtual image display system and method that is operative to generate real-time three-dimensional threat envelopes of identified threat systems.

A further object of the present invention is to provide a virtual image display system and method that is operative to display real-time perspective video images of the three-dimensional threat envelopes of identified threat systems for viewing by the pilot.

These and other objects of the present invention are achieved by means of a virtual image display system for an ownship that is operative to identify threat systems nearby a flight path of the ownship, to generate a three-dimensional threat envelope of each identified threat system, and to display real-time perspective video images of each such three-dimensional threat envelope for viewing by a pilot of the ownship. The virtual image display system according to the present invention comprises a video display subsystem for generating and displaying video images to the ownship pilot, means for sensing the attitude and position of the head of the ownship pilot in relation to an ownship cockpit coordinate system, a digital terrain database for providing topographical data and information with respect to terrain proximal the flight path of the ownship, database information with respect to threat systems proximal the flight path of the ownship, database means for providing navigational data and dynamic state information with respect the ownship and computer processing means functionally interconnected to the threat systems database means and the navigational data/dynamic state database means and operative for identifying each threat system nearby the flight path of the ownship when the ownship is within a threat range of such threat system.

The computer processing means is also functionally interconnected to the video display subsystem, the attitude/position sensing means, the digital terrain database, the threat systems database means, and the navigational data/dynamic state database means and operative for generating a three-dimensional threat envelope of each identified threat system. The computer processing means is further functionally interconnected to the video display subsystem, the attitude/position sensing means, the digital terrain database, the threat systems database means, and the navigational data/dynamic state database means and operative for displaying real-time perspective video images of each said generated three-dimensional threat envelope for viewing by the ownship pilot.

Further according to the present invention, a method is provided for providing threat information to a pilot of an ownship flying a flight path by means of a video display subsystem. The method includes steps of identifying each threat system proximal the flight path of the ownship when the ownship is within a threat range of the threat system, generating a three-dimensional threat envelope of each identified threat system, storing each generated three-dimensional threat envelope in a computer memory cache, and determining, for each stored three-dimensional threat envelope, whether any portion thereof is within a system field of view of the ownship. If it is determined that no portion of the three-dimensional threat envelope is within the system field of view, the method is reinitiated at the identification step.

If it is determined that a portion of the three-dimensional threat envelope is within the system field of view, a perspective video image of such portion of the three-dimensional threat envelope is displayed for viewing by the pilot of the ownship by means of the video display subsystem. The steps of generating a three-dimensional threat envelope, of storing the three-dimensional threat envelope, of determining whether any portion of the three-dimensional threat envelope is within the system field of view, and of displaying a perspective video image of such portion of the three-dimensional threat envelope for viewing by the pilot are repeated as required to display a continuous series of real-time perspective video images of the three-dimensional threat envelope for viewing by the pilot of the ownship by means of the video display subsystem.

BRIEF DESCRIPTION OF THE DRAWINGS

A more complete understanding of the present invention and the attendant features and advantages thereof may be had by reference to the following detailed description of the invention when considered in conjunction with the accompanying drawings wherein:

FIG. 1 is a block diagram of one embodiment of a virtual image display (VID) system according to the present invention.

FIG. 2 is a side view of a exemplary helicopter (ownship) in which the VID system of FIG. 1 has utility.

FIG. 3 is a side view of a helmet mounted display subsystem that functions as the preferred embodiment of a video display subsystem for the VID system of FIG. 1.

FIG. 5A is an illustrative look-up table of the threat systems database of the VID system of FIG. 1.

FIG. 5B is an illustrative look-up table for the threat systems characteristics database of the VID system of FIG. 1.

FIG. 6I illustrates an optional substep for the display step of the method according to the present invention.

FIG. 6J illustrates one embodiment for the optional substep of FIG. 6I.

FIG. 6K illustrates another embodiment for the optional substep of FIG. 6I.

FIG. 6L illustrates an optional substep for the method illustrated in FIG. 6.

FIG. 6M illustrates further substeps of the optional substep illustrated in FIG. 6I.

FIG. 6N illustrates an optional substep for the method illustrated in FIG. 6.

FIG. 6O illustrates further substeps of the optional substep illustrated in FIG. 6N.

FIG. 6P illustrates an optional substep for the method illustrated in FIG. 6.

FIG. 6Q illustrates further substeps of the optional substep illustrated in FIG. 6P.

BEST MODES FOR CARRYING OUT THE INVENTION

Figure 4:
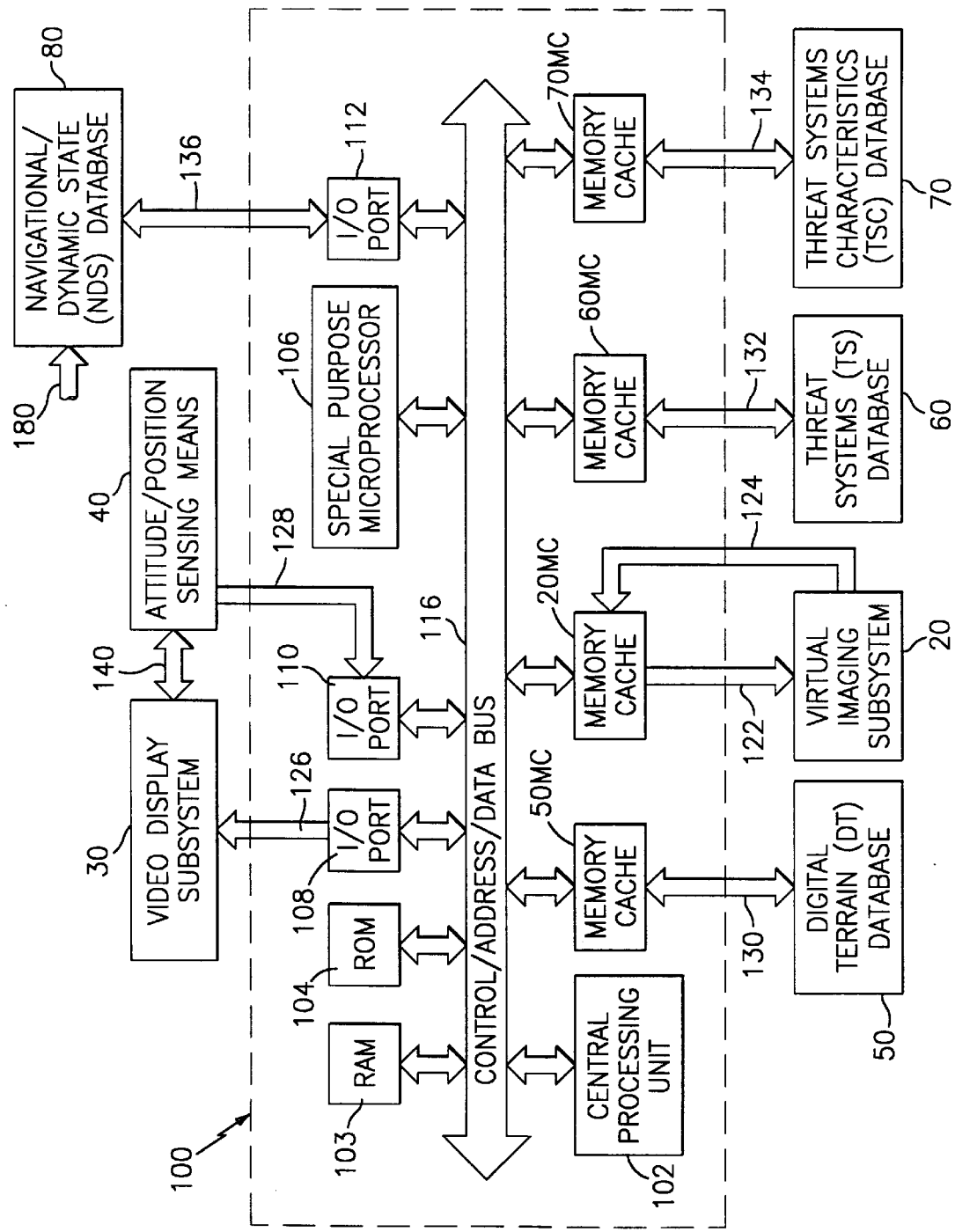
FIG. 4 is a block diagram of one embodiment of a primary processing, interface, and control means for the VID system of FIG. 1.

Referring now to the drawings wherein like reference numerals identify corresponding or similar elements throughout the several views, FIG. 1 depicts an aircraft virtual image display (VID) system 10 according to the present invention that is operative to: (i) identify nearby threat systems, i.e., threat systems wherein the "ownship" (ownship as used herein means an aircraft embodying the VID system 10) is (or will be) operating within the threat envelope thereof; (ii) to generate real-time three-dimensional threat envelopes of identified threat systems; and (iii) to display real-time continuously-changing perspective video images of such threat envelopes in relation to the flight path of the ownship. The VID system 10 may be further operative to provide an indication of the time and/or spatial relationships of such threat envelopes with respect to the current position and/or short-term projected flight path of the ownship and/or the anticipated lethality of each identified threat system to the ownship. Anticipated lethality as used herein expresses a probability of detection of the ownship by a particular threat system, a probability of acquisition of the ownship by such threat system, or a probability of the ownship being intercepted, i.e., fired upon, by such threat system. The VID system 10 may also be operative to provide a timeline indication, e.g., expressed as a countdown in seconds, with respect to the ownship being detected, acquired, or fired upon by the threat system.

The VID system 10 according to the present invention includes a virtual imaging subsystem 20, a video display subsystem 30, a means 40 for sensing the attitude and position of the pilot's head within the cockpit, a digital terrain (DT) database 50, a threat systems (TS) database 60, a threat systems characteristics (TSC) database 70, a navigational/dynamic state (NDS) database 80, and a primary processing, interface, and control (PPIC) means 100. The VID system 10 is operative to provide virtual images of the environment external to the ownship depending upon the flight conditions under which the ownship is operating, to generate video displays based upon these virtual images, to identify nearby threat systems in a hostile environment, to generate real-time three-dimensional threat envelopes of identified threat systems, and to continuously transmit real-time perspective video images of such threat envelopes for viewing by the pilot via the video display subsystem 30 to enhance the pilot's situational awareness during pilotage of the ownship in such a hostile environment. While the VID system 10 has particular utility for piloting of an ownship during non-visual flight conditions such as night and/or adverse weather conditions, it should be appreciated that the VID system 10 also has utility during visual flight conditions as described hereinbelow in further detail. The functional characteristics of the virtual imaging subsystem 20, the video display subsystem 30, the attitude/position sensing means 40, and the PPIC means 100, as set forth in the following paragraphs, are also described in U.S. Pat. No. 5,296,854.

The VID system 10 is described herein in conjunction with the RAH-66 Comanche helicopter H, as illustrated in FIG. 2, as the ownship. The ownship H includes an electromagnetically transparent nose section NS that houses the virtual imaging subsystem 20 and a cockpit CP. The virtual imaging subsystem 20 is operative to provide continuous virtual images of the external world during nonvisual flight conditions, e.g., night and/or adverse weather. The term virtual images as used herein defines a realistic, high-definition pictorial representation of the external world that corresponds in structural definition to the same external world if viewed by the human visual system, e.g., an M-1 tank is recognizable as an M-1 tank. It will be appreciated that the VID system 10 according to the present invention may be utilized in other types of helicopters and in aircraft generally.

The operating characteristics and capabilities of virtual imaging subsystems 20 of the type having utility in the VID system 10 of the present invention are well known to those skilled in the art. For example, during night flight operations, a forward looking infrared (FLIR) imaging subsystem 20 may be used to generate continuous high-definition infrared virtual images of the external environment. The FLIR imaging subsystem 20 senses differences in thermal radiation emissions of the elements of the external environment within the field of view (FOV) of the FLIR sensors and generates signals representative of such thermal differentials that are subsequently processed by the PPIC means 100 to provide such high-definition virtual images.

Other imaging systems such as low-light television systems, radar systems, or other sensors (either active or passive) that are capable of providing high-definition virtual images of the external world may be utilized as the virtual imaging subsystem 20 in the VID system 10 according to the present invention. The virtual imaging subsystem 20 is preferably slaved to the video display subsystem 30 so that the FOV of the virtual imaging subsystem 20 is automatically aligned, e.g., by gimbaled movement of the image sensor within the nose structure NS of the ownship H, with the optical axis of the pilot of the ownship H (the optical axis is defined as a straight line projecting outwardly from the pilot's head from a point midway between the pilot's eyes).

The video display subsystem 30 of the VID system 10 is operative to provide video images of the external environment (derived from the virtual images captured by the virtual imaging subsystem 20) and/or real-time perspective video images of the threat envelopes of identified threat systems within the system FOV of the ownship/pilot (see further discussion hereinbelow with respect to system FOV).

With reference to FIG. 3, the preferred embodiment of the video display subsystem 30 is a helmet mounted display (HMD) subsystem. Other types of video display subsystems such as a heads-up display (HUD) subsystem or a holographic subsystem can be used as the video display subsystem 30 in the VID system 10 of the present invention.

The HMD subsystem 30 includes a helmet 32 and a visor-type screen 34. The visor-type screen 34 may be removably attached to the helmet 32 so that the screen 34 may be removed for visual flight operations if desired. The screen 34 is fabricated with a defined curved configuration to provide a panoramic FOV for the pilot, e.g., 30°×60° vertically and laterally, respectively, with respect to the optical axis of the pilot's visual system.

The screen 34 is preferably fabricated as a reflective part of an optical train by utilizing a screen material that is partially reflective so that the screen 34 is operative to focus and display collimated video images within the FOV of the pilot's visual system. Concomitantly, the screen 34 is further fabricated to be partially transparent to visible light radiation from the external environment. The screen 34 is thus operative to facilitate direct viewing of the external environment via the pilot's visual system during visual flight conditions.

During nonvisual flight operations, therefore, the HMD subsystem 30 is operative to project perspective video images of the external environment (as derived from the virtual images captured by the virtual imaging subsystem 20) and of the three-dimensional threat envelopes of nearby threat systems onto the screen 34 for viewing by the pilot. During visual flight operations, in contrast, the HMD subsystem 30 is operative to continuously project real-time perspective video images of the three-dimensional threat envelopes of identified threat systems onto the screen 34 for viewing by the pilot while the pilot simultaneously views the external environment directly through the screen 34.

The HMD subsystem 30 may be binocular and may include dual miniaturized cathode ray tubes (CRTs) 36 such as those manufactured by Thomas Electronics, Hughes Aircraft, or AT&T Bell Laboratories, that receive image signals from the PPIC means 100 and generate high-definition video images therefrom. A one-inch diameter CRT 36 can provide 1200 video lines, e.g., a 1200×1200 pixel matrix. Associated with each CRT 36 is a collimating optical train 38 that provides the optical interface between the CRTs 36 and the screen 34. The optical trains 38 magnify and collimate the video images generated by the CRTs 36 for projection onto the screen 34. HMD subsystems 30 having utility in the VID system 10 of the present invention are generally known to those skilled in the art. A representative example of such an HMD subsystem 30 is described in U.S. Pat. No. Re 28,847.

Associated with the helmet 32 is the attitude/position sensing means 40 that defines the angular orientation and/or spatial position of the pilot's head within the cockpit CP of the ownship H. One example of an attitude/position sensing means 40 is illustrated in FIG. 3, and comprises a sensor 42 mounted in combination with the helmet 32 and an electromagnetic radiator 44 mounted in the cockpit CP adjacent the helmet 32. The sensor 42 is responsive to constant field strength electromagnetic radiation emitted by the radiator 44 to generate attitude/position signals corresponding to the angular orientation and spatial position, of the pilot's head within the cockpit CP based upon the field strength and phase of the intercepted radiation. These attitude/position signals are coupled to the PPIC means 100 which processes such signals to identify the perspective of the pilot's head within the cockpit CP. See U.S. Pat. No. 5,296,854 for further discussion of this feature of the VID system 10. Attitude/position sensing means 40 having utility in the VID system 10 of the present invention are generally known to those skilled in the art. For example, three-axis Polhemus systems that provide signals indicative of the angular orientation of the helmet 32 in three axes are described in U.S. Pat. Nos. 4,017,858 and 3,983,474.

The PPIC means 100 of the VID system 10 is illustrated in further detail in FIG. 4 as a stand-alone dedicated computer system. One skilled in the art will appreciate that the PPIC means 100 could alternatively be implemented by utilizing the flight control computer system of the ownship. The PPIC means 100 includes a central processing unit 102, a random access memory (RAM) 103, a read-only memory (ROM) 104, a dedicated special purpose microprocessor 106 for generating three-dimensional geometric figures such as the "geometry engine" marketed by Silicon Graphics, input/output ports 108, 110, 112, a control/address/data bus 116, and dedicated memory caches 20MC, 50MC, 60MC, 70MC. The described embodiment of the PPIC means 100 is illustrated in generalized form as a general purpose computer that may have forms different than that specifically illustrated and described herein. For example, the computer architecture could be a split processor type having plural buses wherein one bus is dedicated to input/output tasks and communication functions while another bus is dedicated to image processing, definition functions, map line reconstruction, and video formatting. For architectures employing more than a single bus, each bus would typically include a dedicated processing unit such as a Motorola 680X0, MIPS R4000, or PowerPC microprocessor or an INTEL® 80X86, PENTIUM®, or PENTIUM® PRO microprocessor. The PPIC means 100 may be implemented in the form of Very High-Speed Integrated Circuitry (VHSIC) with less than 1 micron between geometric features. Such a PPIC means 100 can have more than 64 megabytes of internal memory, and the capability of executing at least 100 million instructions per second (MIPS) and 300+ million operations per second.

The PPIC means 100 provides electronic interfacing among the various subsystems comprising the VID system 10 described hereinabove via signal buses 122, 124, 126, 128, 130, 132, 134, and 136, respectively. Interactive coupling between the HMD subsystem 30 and the attitude/position sensing means 40 is provided via signal bus 140.

The PPIC means 100 provides control signals via signal bus 122 to synchronize the spatial orientation of the virtual imaging subsystem 20 with the viewing perspective of the pilot, i.e., to align the FOV of the virtual imaging subsystem 20 with the optical axis of the pilot's visual system. The control signals coupled through the signal bus 122 are provided by the central processing unit 102 based upon the attitude/position signals provided by the attitude/position sensing means 40.

The PPIC means 100 further provides the necessary processing capability required by the VID system 10 of the present invention. This capability includes processing of the virtual image signals generated by the virtual imaging subsystem 20 and input via the signal bus 124, memory cache 20MC (a dedicated memory cache such as a high-speed static RAM (SRAM) is provided in combination with the virtual imaging subsystem 20 in the described embodiment of the VID system 10 to facilitate image processing) to provide corresponding signals to the HMD subsystem 30, via the I/O port 108, signal bus 126, for generation of video images corresponding to the virtual images of the external environment during nonvisual flight conditions. In addition, the PPIC means 100 embodies the processing capability to identify nearby threat systems, to generate three-dimensional threat envelopes of identified threat systems, and to display real-time perspective video images of the such three-dimensional threat envelopes. The PPIC means 100 is also operative to define the viewing perspective of the pilot based upon attitude/position signals provided by the attitude/position sensing means 40 via the signal bus 128, I/O port 110.

As noted above, the VID system 10 according to the present invention further includes the DT database 50, the TS database 60, the TSC database 70, and the NDS database 80. These specific features of the VID system 10 provide the background data and information necessary for the PPIC means 100 to identify nearby threat systems that impact (or may impact) the flight path of the ownship, to generate three-dimensional threat envelopes of identified threat systems, and to display real-time perspective video images of such three-dimensional threat envelopes onto the screen 34 of the HMD subsystem 30 for viewing by the pilot.

The PPIC means 100 is interconnected to the DT database 50 by means of the signal bus 130, memory cache 50MC. The DT database 50 is a three-dimensional representation of the topographical data and information for the terrain proximate the ownship's mission flight path in the form of horizontal grids, i.e., latitude and longitude grid lines, and terrain elevations (based upon mean sea level) at the grid line intersections. While the level of resolution of the DT database 50 is a matter of design choice that depends, inter alia, on the characteristics of the ownship, the nature of the mission the ownship is executing, the nature of the terrain the ownship will overfly during the mission, and the characteristics of the threat systems that will be encountered by the ownship during the mission, from an operational point of view the preferred level of resolution of the DT database 50 is about 25 meters (82 feet) for the horizontal grid lines (approximately two rotor diameters of the ownship H illustrated in FIG. 2), and about one meter (3 feet) in the vertical plane (elevation). The DT database 50 is a mission-sized terrain database and, due to the voluminous amount of topographical data and information stored therein, is typically a mass storage device such as a static RAM or a CD-ROM wherein the topographical data and information can be stored in a nonvolatile form.

Current topographical data and information (as used herein, "current" refers to topographical data and information with respect to the terrain proximate the current, past, and short-term projected positions of the ownship as discussed hereinbelow in further detail) is stored in volatile form in the dedicated memory cache 50MC in the described embodiment of the VID system 10 so that such current topographical data and information is readily accessible to the PPIC means 100. The PPIC means 100 is operative to continuously update the current topographical data and information stored in the dedicated memory cache 50MC as the current position of the ownship changes, i.e., as the ownship moves along its flight path.

Further, the PPIC means 100 is interconnected to the TS database 60 by means of the signal bus 132, memory cache 60MC. The TS database 60 is a mission-sized threat systems database stored in a nonvolatile form in a mass storage device, e.g., static RAM or a CD-ROM. The TS database 60 includes geographical map coordinates and elevations of known threat systems and may include an identification code, e.g., North Atlantic Treaty Organization (NATO) code designation. See, for example, the threat system look-up table illustrated in FIG. 5A that defines exemplary threat systems TS-1, TS-2, TS-3, and TS-4 that may pose a threat to an ownship in the immediate vicinity thereof. The geographic coordinates of known threat systems as stored in the TS database 60 are compatible with the coordinate system of the DT database 50 so that the PPIC means 100 can correlate specific threat systems with the DT database 50 for the identification of nearby threat systems that impact (or may impact) the ownship flight path, the generation of the three-dimensional threat envelopes of such threat systems, and the display of the perspective video images of such three-dimensional threat envelopes. Geographic coordinates and terrain elevations of threat systems proximate the current position and short-term projected position of the ownship are stored in the dedicated memory cache 50MC in the described embodiment of the VID system 10 so that such current geographical data is readily accessible to the PPIC means 100. The PPIC means 100 is operative to continuously update the geographical data stored in the dedicated memory cache 50MC as the current position of the ownship changes, i.e., as the ownship moves along its flight path.

One skilled in the art will appreciate that the geographical coordinates of known threat systems could alternatively be incorporated directly into the DT database 50. However, it is contemplated that the DT database 50 and the TS database 60 would be maintained as separate databases for ease of continually updating or revising the voluminous amounts of data embodied in such databases.

The PPIC means 100 is also interconnected, via the signal bus 134, memory cache 70MC, to the TSC database 70 which comprises intelligence data and information regarding the functional characteristics of each threat system stored in the TS database 60 (and the mission threat systems database). Generally, such threat systems include a means for initially detecting targets (typically a search radar, although other types of detectors, e.g., an optical detector, may be employed), a means for providing accurate range and angle measurements with respect to a detected target, i.e., acquisition of the detected target (typically a tracking radar, although other types of tracking means, e.g., an optical tracker, may be employed), and a weapon subsystem, e.g., an antiaircraft gun, surface-to-air or air-to-air missiles or directed energy beam, having the capability to damage or destroy an acquired target. Relevant characteristics for such threat systems for the VID system 10 according to the present invention include the operating frequencies of the search and tracking radars, the detection range of the search radar, the acquisition range of the tracking radar, the intercept range of the associated weapon subsystem, and timelines for the detection, acquisition, weapon release, and time-to-target phases. The detection range is defined as the range at which the search radar associated with a specific threat system can potentially detect a target. It will be appreciated that target detection can depend, inter alia, on the radar cross section (RCS) of the potential target (for example, compare the low RCS of the F-117 stealth fighter to the relatively high RCS of a Boeing 747 airliner). The acquisition range is defined as the range at which the tracking radar can lock onto and track a detected target. The intercept range is defined as the range of the associated weapon subsystem for intercepting and negating the acquired target.

Response timelines for representative threat systems with respect to the detection phase, acquisition phase, and the weapon release phase are presented in FIG. 5B (time-to-target timelines not included since these timelines are variables depending, inter alia, on the distance between the ownship and the threat system TS, the dynamic state of the ownship, the weapon of the weapon subsystem, etc. For example, with respect to the third threat system (TS-3), which is identified in FIG. 5A as an SA-17 threat system, FIG. 5B reveals that detection of an ownship can occur in approximately 12 seconds (assuming that the ownship is within the detection range of the threat system and that there is an unobstructed line of sight between the search radar and the ownship), acquisition can occur approximately 15 seconds after detection (under the same assumptions), and the weapon can be fired (weapon release) approximately 8 seconds after acquisition has occurred. FIG. 5B also depicts the total response timeline for a particular threat system, e.g., for the described example a total response time of 35 seconds for the SA-17.

The relevant characteristics data of known threat systems along the ownship mission flight profile (threat systems that pose a potential risk to the ownship) are formatted as look-up tables systems and stored in a nonvolatile form in a mass storage device, e.g., static RAM, hard disk, or a CD-ROM. This stored data forms a comprehensive threat systems characteristics database 70 that is accessible by the PPIC means 100 via the signal bus 134, memory cache 70MC. Current characteristics data from the TSC database 70 representing the threat systems proximate the ownship's current position (and the short-term projected flight path of the ownship) is stored in volatile form in the memory cache 70MC so that the current characteristics data is readily available to the PPIC means 100. The PPIC means 100 is operative to continually update the characteristics data in the memory cache 70MC, via the signal bus 134, from the comprehensive TSC database 70 as the ownship flight path changes. One skilled in the art should appreciate that the TS database 60 and the TSC database 70 may be implemented as a single database, but for purposes of the present description these databases are presented as separate and distinct databases.

The PPIC means 100 is also operative to access and process data stored in the NDS database 80 by means of signal bus 136, I/O port 112. The NDS database 80 includes current and recent past navigational data, e.g., inertial coordinates of the ownship as coupled to the NDS database 80 by means of a real-time global positioning system (GPS) downlink or from the ownship's inertial navigation system. The NDS database 80 further includes current, recent past, and short-term projected ownship six degree-of-freedom dynamic states that are coupled to the NDS database 80 from the automatic flight control system of the ownship. As used herein, the terminology six degree-of-freedom dynamic state (hereinafter "dynamic state") completely defines the pertinent flight parameters of the ownship for purposes of the present invention. The PPIC means 100 is operative to incrementally update the navigational data and dynamic state information of the ownship as required by causing current navigational data and dynamic state information to be downloaded from the ownship's navigation system and the automatic flight control system, respectively. One skilled in the art will appreciate that the PPIC means 100 could alternatively be interfaced with the navigation system and the automatic flight control system to directly access navigational data and dynamic state information in lieu of utilizing a dedicated NDS database 80.

Figure 6:
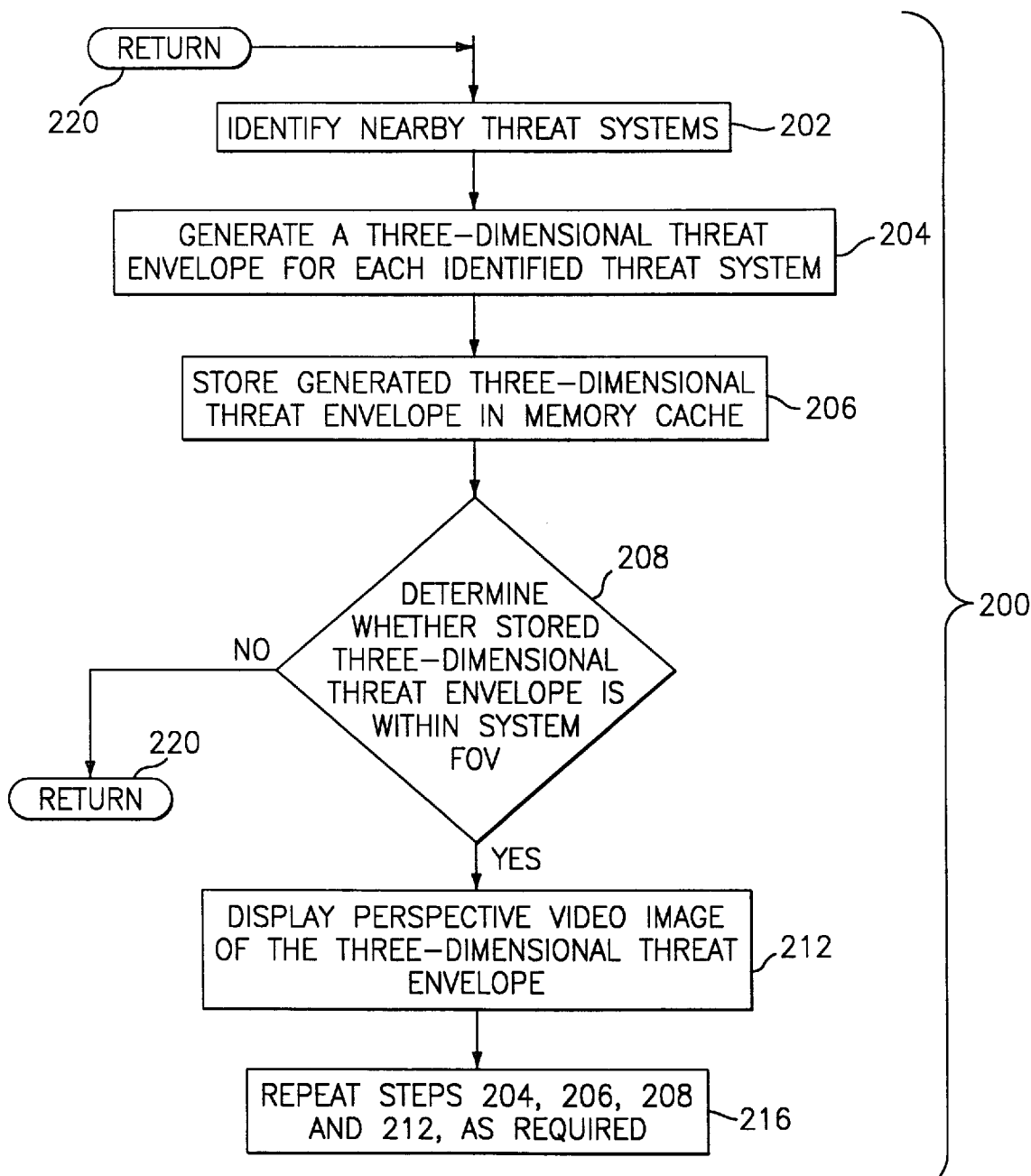
FIG. 6 illustrates one embodiment of a method according to the present invention for identifying nearby threat systems, for generating real-time three-dimensional threat envelopes of identified threat systems, and for displaying real-time perspective video images of such threat envelopes for viewing by the pilot.

As disclosed above, the VID system 10 according to the present invention is operative to identify nearby threat systems, to generate real-time three-dimensional threat envelopes of identified threat systems, and to continuously display real-time perspective video images of such threat envelopes for viewing by the pilot during the ownship mission. One method 200 according to the present invention for identifying such threat systems, for generating real-time three-dimensional threat envelopes, and for continuously displaying real-time perspective video images of such threat envelopes by means of the HMD subsystem 30 is illustrated in FIG. 6 and described in further detail in the following paragraphs.

In a first step 202, the VID system 10 identifies each threat system having a "range" that intersects the current position or the short-term projected flight path of the ownship, i.e., the ownship is (or will be) within a "threat range" defined for such threat system. As used herein, the short-term projected flight path of the ownship is defined as the flight path of the ownship for a period of T seconds beyond the current position based upon the dynamic state of the ownship at the current position. For the embodiment of the method 200 described herein, T is approximately twenty seconds. One skilled in the art will appreciate that, depending upon the characteristics of the ownship, the nature of the mission the ownship is executing, the characteristics of the threat systems that will be encountered by the ownship during the mission, and the nature of the terrain the ownship will overfly during the mission, other values for T may be selected. Alternatively, in step 202 the VID system 100 identifies only those threat systems that are nearby the current position of the ownship.

The identification step 202 is preferably based upon one of the ranges associated with the threat system—either the detection range, the acquisition range, or the intercept range. While any one, or any combination, of these ranges may be used in the identification step 202, the detection range is used in the following discussion for the purpose of simplifying the explanation. The detection range will be most often used in the identification step 202 inasmuch as it represents the extreme range of the threat system, and therefore, provides the pilot of the ownship with the earliest warning that the ownship is being operated within the "threat range" of such threat system.

Figure 6A:
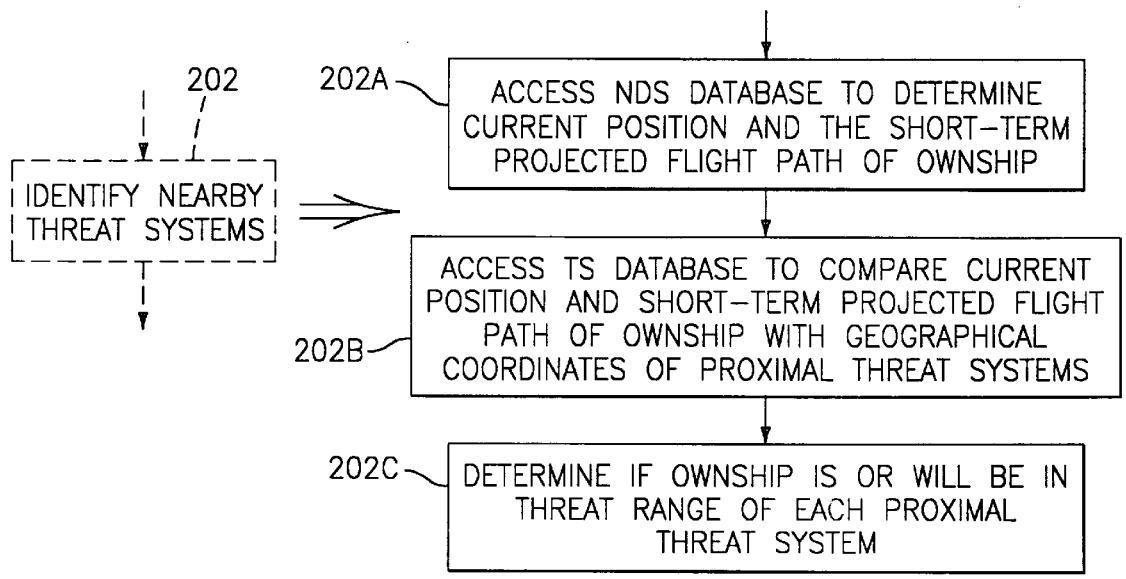
FIG. 6A illustrates exemplary substeps for the identification step of the method illustrated in FIG. 6.
Figure 6B:
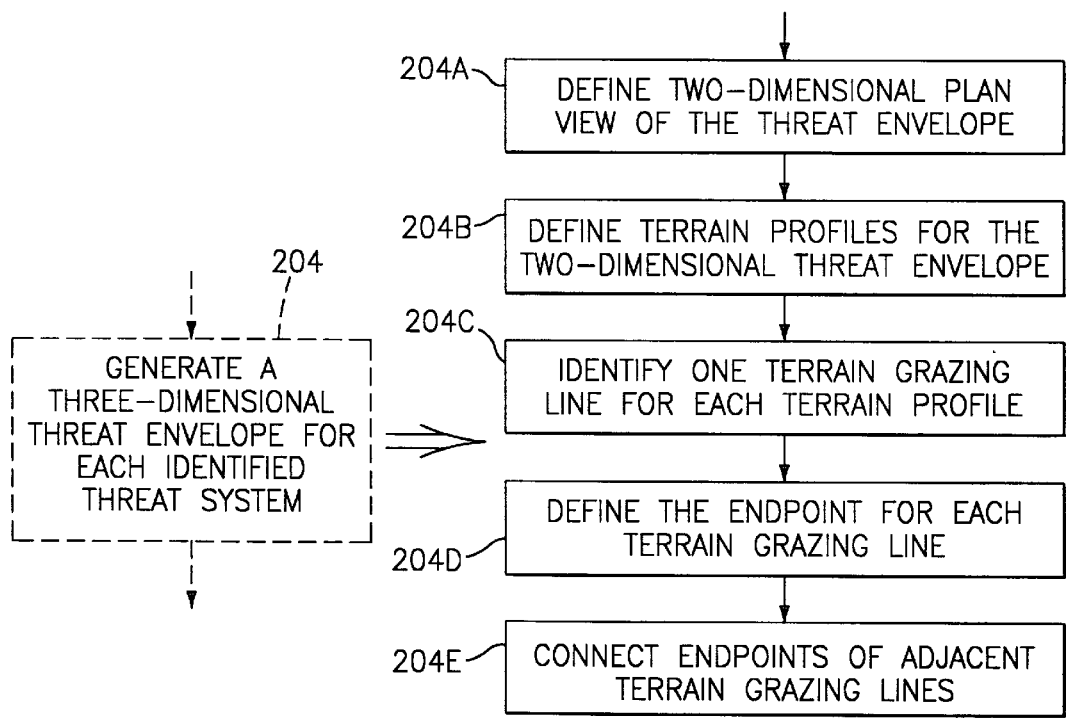
FIG. 6B illustrates exemplary substeps for the generation step of the method illustrated in FIG. 6.

The PPIC means 100 performs the following functions to effectuate the identification step 202 (see FIG. 6B). In a first substep 202A, the PPIC means 100 accesses the NDS database 80 to determine the current position and the short-term projected flight path of the ownship. Next, in substep 202B, the PPIC means 100 accesses the TS database 60 to compare the current position and short-term projected flight path of the ownship with the geographical coordinates of the threat systems that are proximal the current position and short-term projected flight path of the ownship. In a final substep 202C, the PPIC means 100 determines whether the ownship is, or will be, within the "threat range" of such proximal threat systems, i.e., if the ownship is or will be within such "threat range", the threat system is "identified" as being nearby.

The "threat range" used in the substep 202 determination is the detection range for each proximal threat system (as determined from the TSC database 70) plus a margin of safety distance (MOS). The selection of an appropriate MOS for the VID system 10 is a matter of design choice that depends, inter alia, upon the characteristics of the ownship, the nature of the mission the ownship is executing, the nature of the terrain the ownship will overfly during the mission, and the characteristics of the threat systems that will be encountered by the ownship during the mission. For the embodiment of the method 200 described herein, the MOS is set at 1,000 meters (3,280 feet). The detection range plus MOS is identified in the discussion herein by the terminology "threat range" wherein the threat range defines a radial emanating from the threat system having a length $D_{fnr}$. Omnidirectional radials, wherein each omnidirectional radial has a length $D_{fnr}$, emanating from a threat system define the theoretical threat zone of any particular threat system.

The remaining steps of the described embodiment of the method 200 according to the present invention are presented in the following paragraphs in terms of a single "identified" threat system for simplicity. It should be appreciated, however, that: (i) there is a marked probability that an ownship may instantaneously encounter multiple, overlapping threat systems during a mission; and (ii) the VID system 10 according to the present invention has the processing capability to simultaneously identify multiple threat systems, to simultaneously generate multiple three-dimensional threat envelopes, and to simultaneously display multiple realtime perspective video images of such multiple threat envelopes.

In step 204, the VID system 10 generates a three-dimensional threat envelope of the threat system identified in step 202. The PPIC means 100 performs the following functions to effectuate the generation step 204.

Figure 6C:
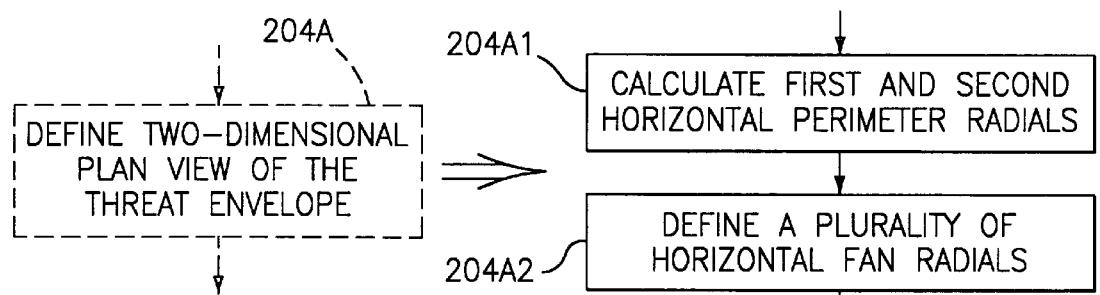
FIG. 6C illustrates further substeps of the two-dimensional plan view definition substep illustrated in FIG. 6B.

In a first substep 204A (see FIG. 6B), the PPIC means 100 defines a two-dimensional plan view of the threat envelope. In substep 204A1 (see FIG. 6C), the PPIC means 100 calculates first and second horizontal perimeter radials 302, 304 based upon past, current, and short-term projected positions of the ownship as illustrated in the two-dimensional plan view of FIG. 7 wherein reference character X designates a first ground coordinate axis, reference character Z designates a second orthogonal ground coordinate axis, reference characters TS designate an "identified" threat system having coordinates $X_{TS}$, $Z_{TS}$, $Y_{TS}$, reference characters $H_C$ designate the current position of the ownship at coordinates $X_H$, $Z_H$, $Y_H$, reference characters GT illustrate the projection of the ownship flight path on the two-dimensional horizontal plane based upon the flight parameters of the ownship at the current position $H_C$, and reference numeral 306 identifies a horizontal radial extending from the threat system TS to the ownship's current position $H_C$.

Figure 7:
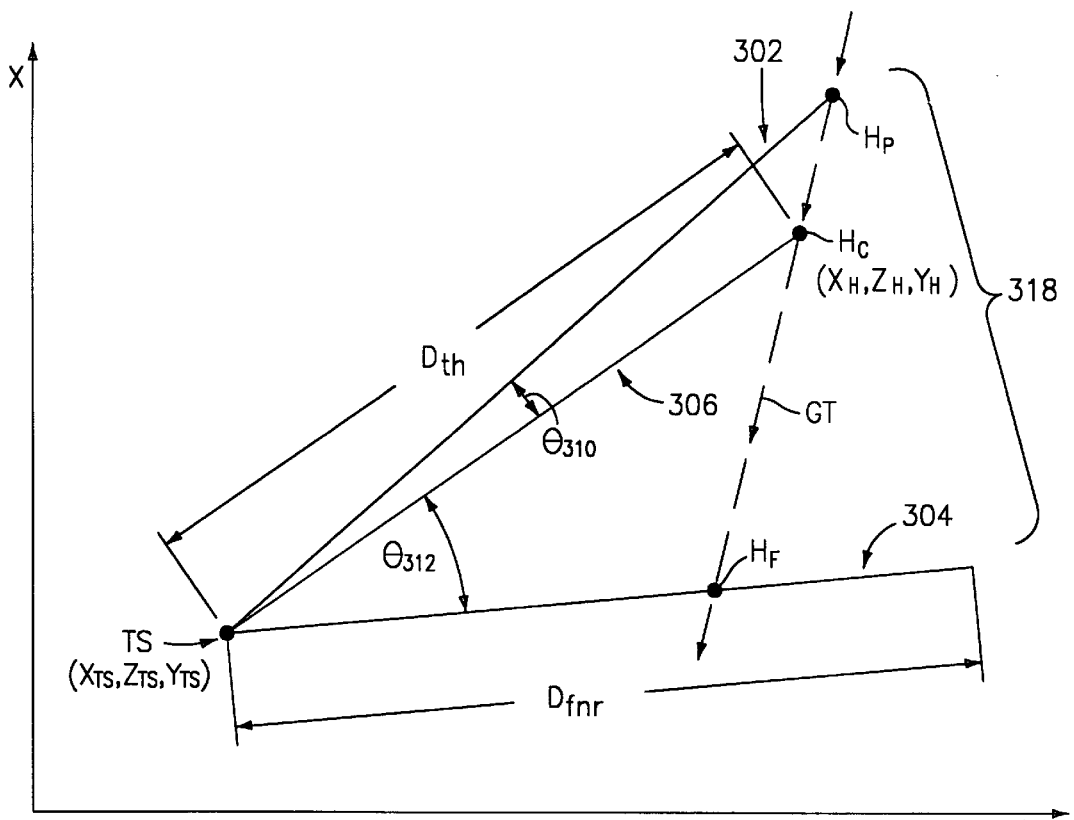
FIG. 7 is a two-dimensional plan view, looking downward, of the position of a threat system and the ownship flight path projected on a horizontal plane that illustrates the threat envelope of such threat system generated by the method depicted in FIG. 6.

The first and second horizontal perimeter radials 302, 304 define the outermost bounds of the two-dimensional threat envelope for the threat system TS (the two-dimensional threat envelope is identified by reference numeral 318 in FIG. 7) based upon the ownship's current position $H_C$ and short-term projected flight path, i.e., the projection GT. The first horizontal perimeter radial 302 is derived by defining a past position $H_P$ of the ownship (either an actual past position based upon navigational data from the NDS database 80 or a backward extension of the projection GT from the current position $H_C$) and extending a horizontal radial having a length equal to the threat range $D_{fnr}$ from the threat system TS towards the past position $H_P$. The second horizontal perimeter radial 304 is derived in a similar manner by defining a short-term projected position $H_F$ of the ownship and extending an intersecting radial having a length equal to the threat range $D_{fnr}$ from the threat system TS towards the short-term projected position $H_F$. The past and short-term projected positions $H_P$, $H_F$ illustrated in FIG. 7 are based upon times $T_P$, $T_F$ respectively, backwards and forward along the groundtrack GT. Selection for the values $T_P$, $T_F$ depends upon the characteristics of the ownship, the nature of the mission the ownship is executing, the nature of the terrain the ownship will overfly during the mission, and the characteristics of the threat systems that the ownship will encounter during the mission. For the described embodiment, $T_P$ equals one second and $T_F$ equals twenty seconds. The value for $T_P$ is generally low since the first horizontal perimeter radial 302 defines the outermost boundary of the two-dimensional threat envelope in a direction that is generally opposite to the direction of the ownship flight path, and thus, of relatively small concern to the ownship pilot in relation to the two-dimensional threat envelope along the shortterm projected flight path.

However, the VID system 10 according to the present invention is adaptive with respect to the calculation of the first horizontal perimeter radial 302 if the PPIC means 100 determines that there is a marked probability that the short-term projected flight path of the ownship may be altered (in a direction generally towards the past position $H_P$ of the ownship). This condition may be evidenced, for example, by the PPIC means 100 monitoring the signals from the attitude/position sensing means 40 and determining that the pilot's FOV (the pilot's optical axis) has been focused in a direction generally towards the past position of the past position $H_P$ of the ownship. Under this condition, the PPIC means 100 is operative to automatically enlarge the value of $T_P$ (the value of $T_F$ may or may not be automatically decreased concomitantly), thereby effectively increasing the value of the counterclockwise angle $\theta_{310}$ (see discussion hereinbelow).

The horizontal radial 306 has a length $D_{th}$ where $D_{th} \leq D_{fnr}$. It will be appreciated that if the radial 306 had a length $D_{th}$ greater than the threat range $D_{fnr}$, the ownship's current position $H_C$ would be beyond the "range" of the respective threat system TS, i.e., the respective threat system TS may not have been "identified" in step 202 of the method 200 unless the short-term projected flight path of the ownship fell with the threat range $D_{fnr}$ of the threat system TS.

An angle $\theta_{310}$ defines a counterclockwise angle between the horizontal radial 306 and the first horizontal perimeter radial 302 and an angle $\theta_{312}$ defines a clockwise angle between the horizontal radial 306 and the second horizontal perimeter radial 304. The sum of the angles $\theta_{310}, \theta_{312}$ defines the angular extent of the threat envelope 318 of the threat system TS based upon the ownship's current position. The angular sum $(\theta_{310}+\theta_{312})$ is a maximum if the flight path of the ownship is perpendicular to the horizontal radial 306, and is a minimum, i.e. equal to zero, if the flight path of the ownship is directly toward the threat system TS (this unusual condition wherein the flight path of the ownship coincides with a radial emanating from the threat system TS is described in further detail hereinbelow). The angular sum $(\theta_{310}+\theta_{312})$ illustrated in FIG. 7 indicates the exemplary circumstance wherein the flight path of the ownship is oblique with respect to the horizontal radial 306.

Figure 8:
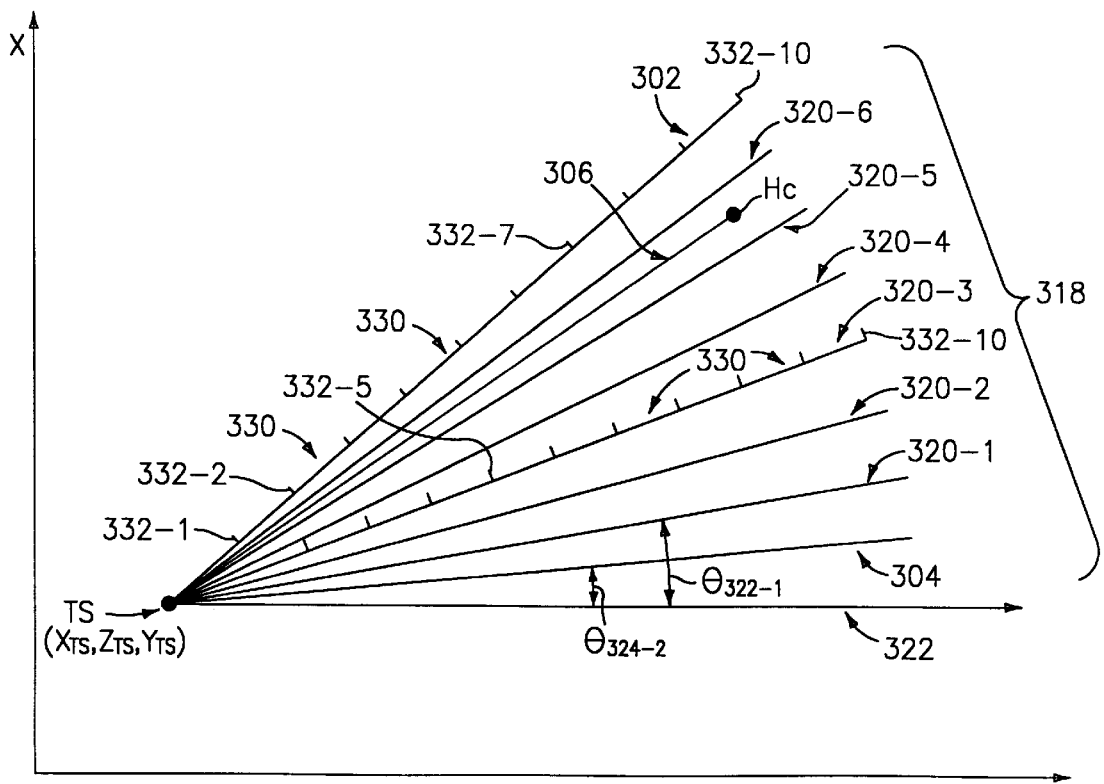
FIG. 8 is the two-dimensional plan view of FIG. 7 illustrating further details of the threat envelope generated by the method depicted in FIG. 6.

The PPIC means 100, in substep 204A2 (see FIG. 6C) defines a plurality of horizontal fan radials 320-N, where N is an integer identifying a respective horizontal fan radial in relation to the second horizontal perimeter radial 304, within the angular extent $(\theta_{310}+\theta_{312})$ defined between the first and second horizontal perimeter radials 302, 304, as illustrated in FIG. 8 (only six horizontal fan radials 320-N, i.e., N=1, 2, 3, 4, 5, 6, are illustrated for purposes of simplicity). Each horizontal fan radial 320-N has a length equal to the threat range $D_{fnr}$.

The maximum number N of horizontal fan radials 320-N defined by the PPIC means 100 is a design trade-off between maximizing the number N of horizontal fan radials 320-N, which enhances the definitiveness of the generated three-dimensional threat envelope (and ultimately, the display of the perspective video images of the three-dimensional threat envelope, thus its utility to the pilot of the ownship), versus the increased computing power required by the PPIC means 100 and/or the slower response of the PPIC means 100 due to increased computational requirements as the number N of horizontal fan radials 320-N increases. One skilled in the art will appreciate that another factor to be considered in such design trade-off is the resolution of the DT database 50.

As depicted in FIG. 8, the horizontal fan radials 320-N are equidistantly spaced between the horizontal perimeter radials 302, 304 (equidistantly spaced horizontal fan radials 320-N may be readily generated by dividing the angular extent ($\theta_{310}+\theta_{312}$) by a divisor D that results in a real integer quotient that equals N). It should be appreciated that the horizontal fan radials 320-N may alternatively be asymmetrically spaced between the horizontal perimeter radials 302, 304. As an examination of FIG. 8 shows, the horizontal radial 306 need not necessarily coincide with any of the horizontal fan radials 320-N. As illustrated in FIG. 8, the two-dimensional threat envelope 318 defined in step 204A comprises the horizontal perimeter radials 302, 304 and the plurality of horizontal fan radials 320-N.

Figure 6D:
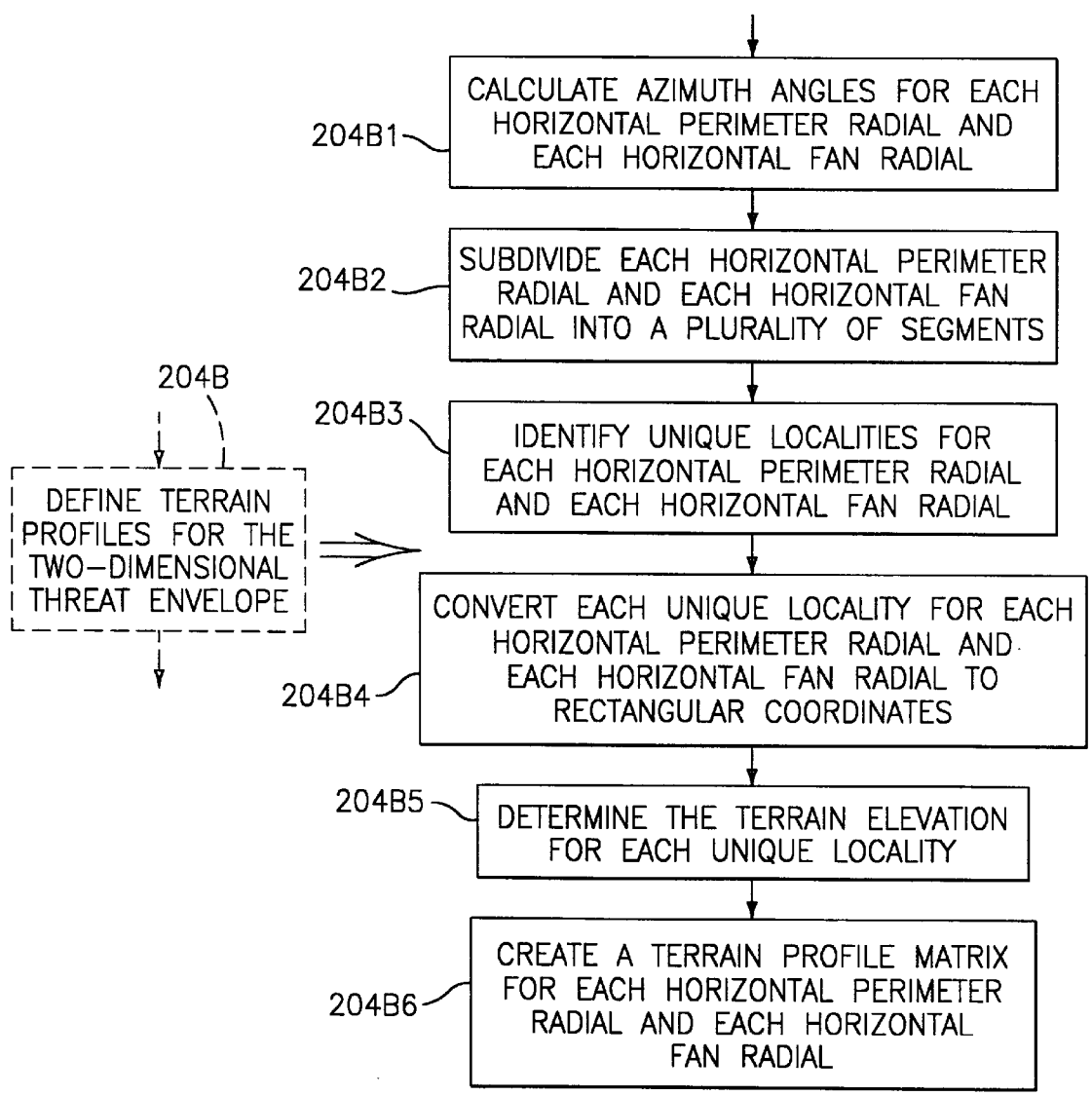
FIG. 6D illustrates further substeps of the terrain profile definition substep illustrated in FIG. 6B.

Next, in substep 204B (see FIG. 6B) the PPIC means 100 defines terrain profiles for the two-dimensional threat envelope 318 defined in substep 204A. The PPIC means 100 calculates the respective azimuth angles $\theta_{322-N}$ between a transposed Z-axis 322 (see FIG. 8) and each of the horizontal fan radials 320-N (only the azimuth angle $\theta_{322-1}$ for the horizontal fan radial 320-1 is illustrated in FIG. 8 to simplify the drawing) in a substep 204B1 (see FIG. 6D). Also in substep 204B1, the PPIC means 100 calculates the azimuth angles between the transposed Z-axis 322 and the horizontal perimeter radials 302, 304 (only the azimuth angle $\theta_{324-2}$ for the second horizontal perimeter radial 304 is illustrated in FIG. 8 to simplify the drawing).

In substep 204B2 the PPIC means 100 utilizes the respective azimuth angles $\theta_{322-N}$, $\theta_{324-1}$ (azimuth angle for horizontal perimeter radial 302 not shown), and $\theta_{324/2}$ calculated in substep 204B1 to subdivide each horizontal fan radial 320-N and each horizontal perimeter radial 302, 304 into a plurality of equal length segments 330 as illustrated in FIG. 8 (only the horizontal fan radial 320-3 and the first horizontal perimeter radial 302 are depicted as segmented in FIG. 8 to simplify the drawing). For the purposes of the present discussion, each horizontal fan radial 320-N and each horizontal perimeter radial 302, 304 is subdivided into ten (10) equal length segments 330, i.e., each segment 330 has a length equal to one-tenth (0.1) of the length of the threat range $D_{fnr}$. The length of each segment 330 is correlated to the resolution of the horizontal grid lines of the DT database 50. Preferably, the length of each segment 330 is equal to the resolution of the horizontal grid of the DT database 50.

The distal ends of respective segments 330 of each horizontal fan radial 320-N and each horizontal perimeter radial 302, 304 (with respect to the threat system TS) define a unique locality 332-E where E is an integer identifying a respective segment 330 of a specific horizontal fan radial 320-N (or a specific horizontal perimeter radial 302, 304) in relation to the threat system TS. That is, for any particular horizontal fan radial 320-N (or horizontal perimeter radial 302, 304), E=1 defines the segment 330 extending from the threat system, E=2 defines the next adjacent segment 330, and so forth. See, for example, FIG. 8 wherein exemplary localities 332-E for the first horizontal perimeter radial 302 and for the third horizontal fan radial 320-3 are illustrated. In substep 204B3, the PPIC means 100 identifies each of the unique localities 332-E for each horizontal fan radial 320-N and each horizontal perimeter radial 302, 304.

Next, in substep 204B4, each unique locality 332-E for each horizontal fan radial 320-N and each horizontal perimeter radial 302, 304 is converted to rectangular coordinates that are compatible with the coordinate system of the DT database 50. First, the PPIC means 100, utilizing the respective azimuth angles $\theta_{322-N}$, $\theta_{324-1}$, and $\theta_{324-2}$, as determined in substep 204B1, and the known length(s) of the individual segment(s) 330 as determined in substep 204B2, defines the polar coordinates of each locality 332-E for each horizontal fan radial 320-N and each horizontal perimeter radial 302, 304. Then, the PPIC means 100 transforms the polar coordinates of each locality 332-E into rectangular coordinates compatible with the coordinate system of the DT database 50.

In substep 204B5 the PPIC means 100 correlates the rectangular coordinates for each unique locality 332-E with the DT database 50 to determine the terrain elevation at such locality 332-E. If the rectangular coordinates of a particular locality 332-E do not correspond exactly to an intersection point of latitude and longitude grid lines in the DT database 50, the PPIC means 100 is operative to perform a two-dimensional interpolation to determine the value of the terrain elevation at such particular locality 332-E based upon adjacent intersection points of the DT database 50 latitude and longitude grids.

Finally, in substep 204B6, the PPIC means 100 creates a terrain profile matrix for each horizontal perimeter radial 302, 304 and each horizontal fan radial 320-N. Each terrain profile matrix is based upon the set E of respective localities 332-E defining the particular horizontal fan radial 320-N (or the particular horizontal perimeter radial 302,304) and comprises a set of discrete horizontal distances (the segments 330) and the terrain elevations associated with such discrete horizontal distances. Each specific locality 332-E, therefore, is defined by: (i) a discrete horizontal distance from the threat system TS, i.e., the known length(s) of the individual segments 330, as determined in substep 204B2; and (ii) a respective terrain elevation, as determined in substep 204B5. Thus, each entry in a terrain profile matrix comprises a discrete horizontal distance and a numerical value (positive, negative, or zero—see discussion in following paragraph) for the associated terrain elevation and these two values, in combination, define a discrete terrain profile point 338-E (see FIGS. 9A, 9B, 9C).

Figure 9A:
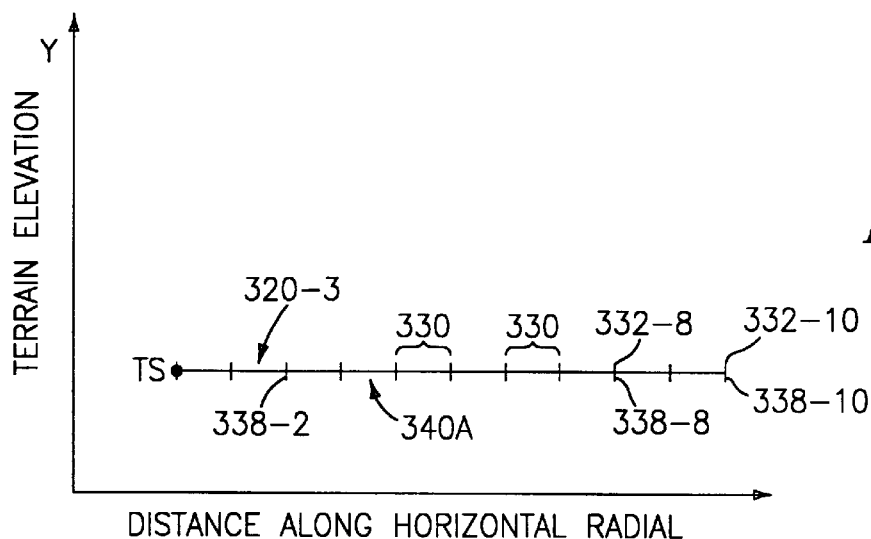
FIGS. 9A, 9B, 9C illustrate representative terrain profiles of threat envelopes defined according to the method of the present invention.
Figure 9B:
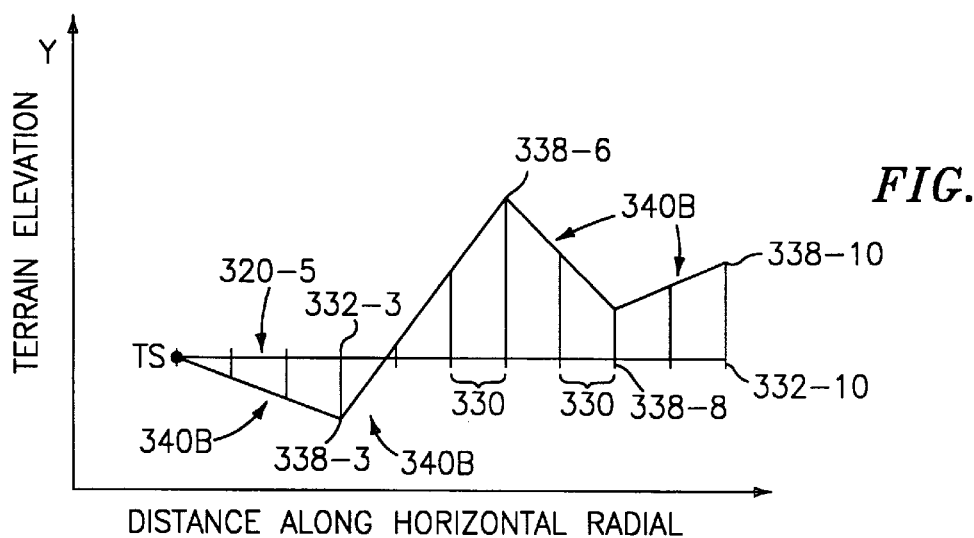
Figure 9C:
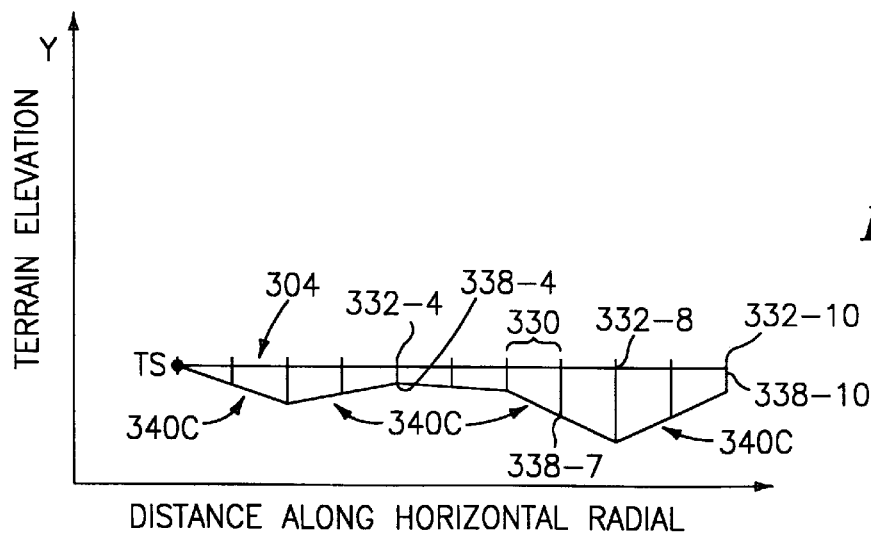

The discrete terrain profile points 338-E comprising each profile matrix define a terrain profile 340 that consists of line segments joining adjacent discrete terrain profile points 338-E. Exemplary terrain profiles 340A, 340B, and 340C for horizontal fan radial 320-3, horizontal fan radial 320-5, and horizontal perimeter radial 304, respectively, are depicted in FIGS. 9A, 9B, 9C wherein the Y-axis represents terrain elevation and the other coordinate axis represents the distance along the selected horizontal radial from the threat system TS. FIG. 9A illustrates the circumstance wherein there are no terrain elevation variations (numerical value of terrain elevation equals zero with respect to the terrain elevation of the threat system TS which is defined as the baseline elevation) along the horizontal fan radial 320-3, i.e., a flat plane. In this circumstance, the discrete terrain profile points 338-E comprising the terrain profile 340A coincide with the localities 332-E defining the horizontal fan radial 320-3. FIG. 9B illustrates the circumstance wherein there are positive and negative terrain variations (positive and negative numerical values with respect to the baseline terrain elevation of the threat system TS) along the horizontal fan radial 320-5, i.e., hills and valleys, respectively. In this circumstance, the terrain profile 340B comprises a plurality of line segments that interconnect adjacent terrain profile points 338-E. FIG. 9C illustrates the circumstance wherein there are only negative terrain variations (negative numerical values with respect to the baseline terrain elevation of the threat system TS) along the horizontal perimeter radial 304, i.e., a series of valleys. In this circumstance, the terrain profile 340C also comprises a plurality of line segments that interconnect adjacent terrain profile points 338-E.

In substep 204C (see FIG. 6B), the PPIC means 100 identifies one terrain grazing line for each terrain profile 340 defined in substep 204B. As noted above, detection (and/or acquisition and/or interception) of an ownship by a threat system can only be accomplished if there is an unobstructed line-of-sight between the threat system and the ownship. To the extent that a terrain feature such as a hill obstructs the line-of-sight between the ownship and the threat system (assuming that the ownship is within the threat range $D_{fnr}$ of the threat system), such obstructing terrain feature masks the ownship from the threat system, i.e., precludes detection of the ownship by the threat system. Therefore, any such an obstructing terrain feature affects the threat envelope of the threat system. Each terrain grazing line provides a concise means of identifying the portion of the threat envelope associated with the corresponding horizontal radial, taking into account the existing terrain features that affect the threat envelope.

Figure 6E:
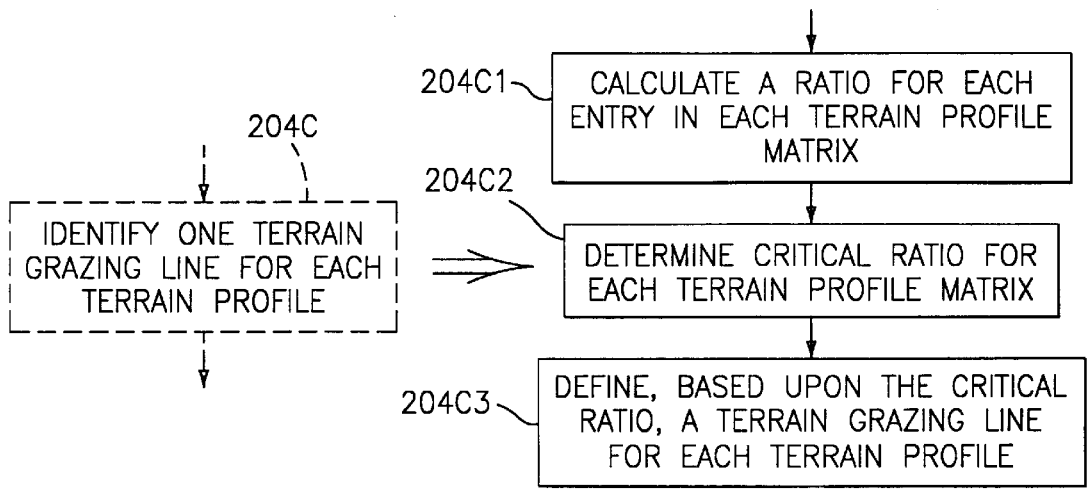
FIG. 6E illustrates further substeps of the terrain grazing line identification substep of FIG. 6B.

To effectuate the identification of such terrain grazing lines, the PPIC means 100 accesses the terrain profile matrix that defines each terrain profile 340 and calculates a ratio for each entry in each terrain profile matrix in substep 204C1 (see FIG. 6E). The calculated ratio is the numerical value of the terrain elevation divided by the discrete horizontal distance, i.e., the tangent of the elevation angle for a specific terrain profile point 338-E. Once the ratios have been calculated for each terrain profile matrix, i.e., each terrain profile 340, of the threat envelope 318, in substep 204C2 the PPIC means 100 determines the critical ratio for each terrain profile matrix, i.e., the specific ratio that defines the terrain grazing line of such profile matrix.

If the terrain profile 340 consists of positive and negative terrain variations (as illustrated in FIG. 9B), the critical ratio for such terrain profile 340 is the ratio having the largest positive value. For example, in FIG. 9B the specific terrain profile point 338-6 defines the critical ratio since it has the largest positive ratio value, i.e., the greatest value of the elevation angle tangent, of the terrain profile points 338-E between the ownship and the threat system TS. If the terrain profile 340 consists of only negative terrain variations (as illustrated in FIG. 9C), the critical ratio for such terrain profile 340 is the ratio having the smallest value of the depression angle tangent, i.e., the smallest negative value. For example, in FIG. 9C the specific terrain profile point 338-4 defines the critical ratio since it has the smallest negative ratio value, i.e., smallest value of the elevation angle tangent. If the terrain profile is a flat plane (as illustrated in FIG. 9A), or a predominantly flat plane with some negative terrain variations, the critical ratio for such terrain profile has a value of zero.

Figure 10A:
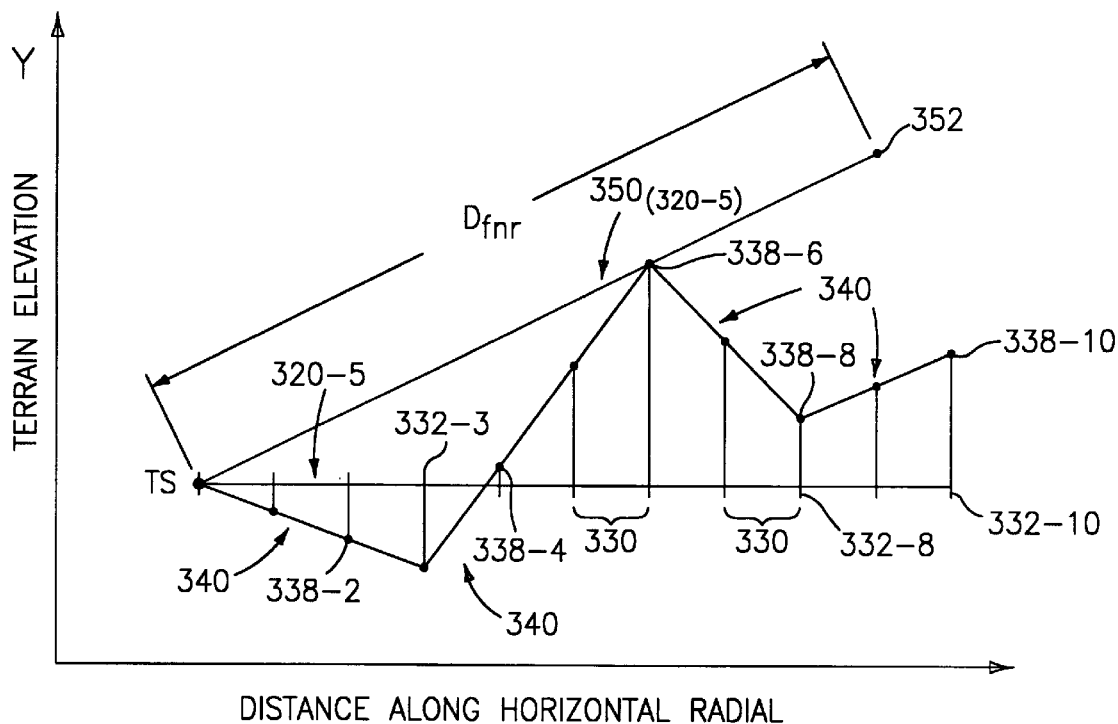
FIGS. 10A, 10B illustrate the terrain grazing lines for the representative terrain profiles illustrated in FIGS. 9B, 9C, respectively.
Figure 10B:
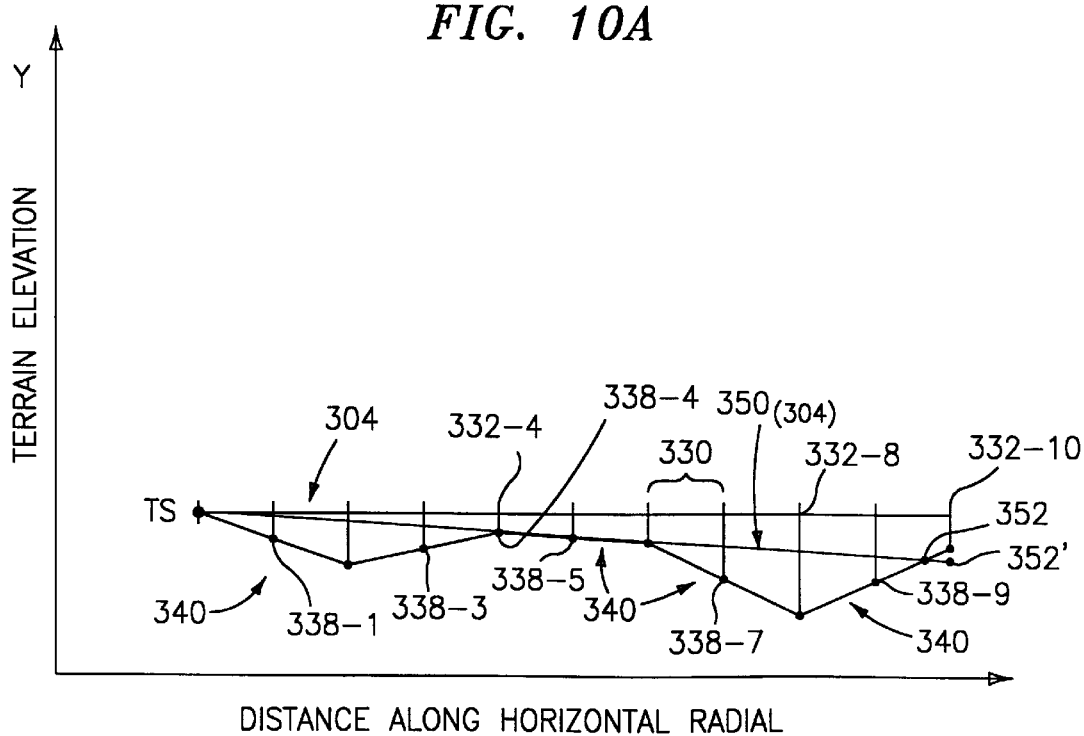

Finally, in step 204C3 the PPIC means 100 defines a terrain grazing line 350 for each terrain profile as exemplarily illustrated in FIGS. 10A, 10B. Since the coordinates of the threat system TS and the coordinates of the terrain profile point 338-E defining the critical ratio are known, a terrain grazing line 350 emanating from the threat system TS to and/or through the terrain profile point 338-E of the critical ratio is easily derived.

Each terrain grazing line 350 terminates at an endpoint 352 (see FIG. 10A). As a general rule, each terrain grazing line 350 has a length $D_{fnr}$, i.e., each terrain grazing line 350 defines the threat range of the threat system TS along a particular radial emanating from the threat system TS, such that the endpoints 352 of each terrain grazing line 350 are readily defined. In some circumstances, however, a terrain grazing line 350 may have a length that is less than the length $D_{fnr}$. For example, a terrain grazing line 350 having a length $D'_{fnr}$, as illustrated in FIG. 10B, would have an endpoint 352' that extends into the local terrain. In this circumstance, the endpoint 352 would be defined as the point at which the terrain grazing line 350 intersects the local terrain such that the terrain grazing line 350 has a length less than the length $D_{fnr}$ defining the threat range of the threat system TS. In substep 204D (see FIG. 6B), the PPIC means 100 defines the endpoints 352 for each terrain grazing line 350.

Figure 11:
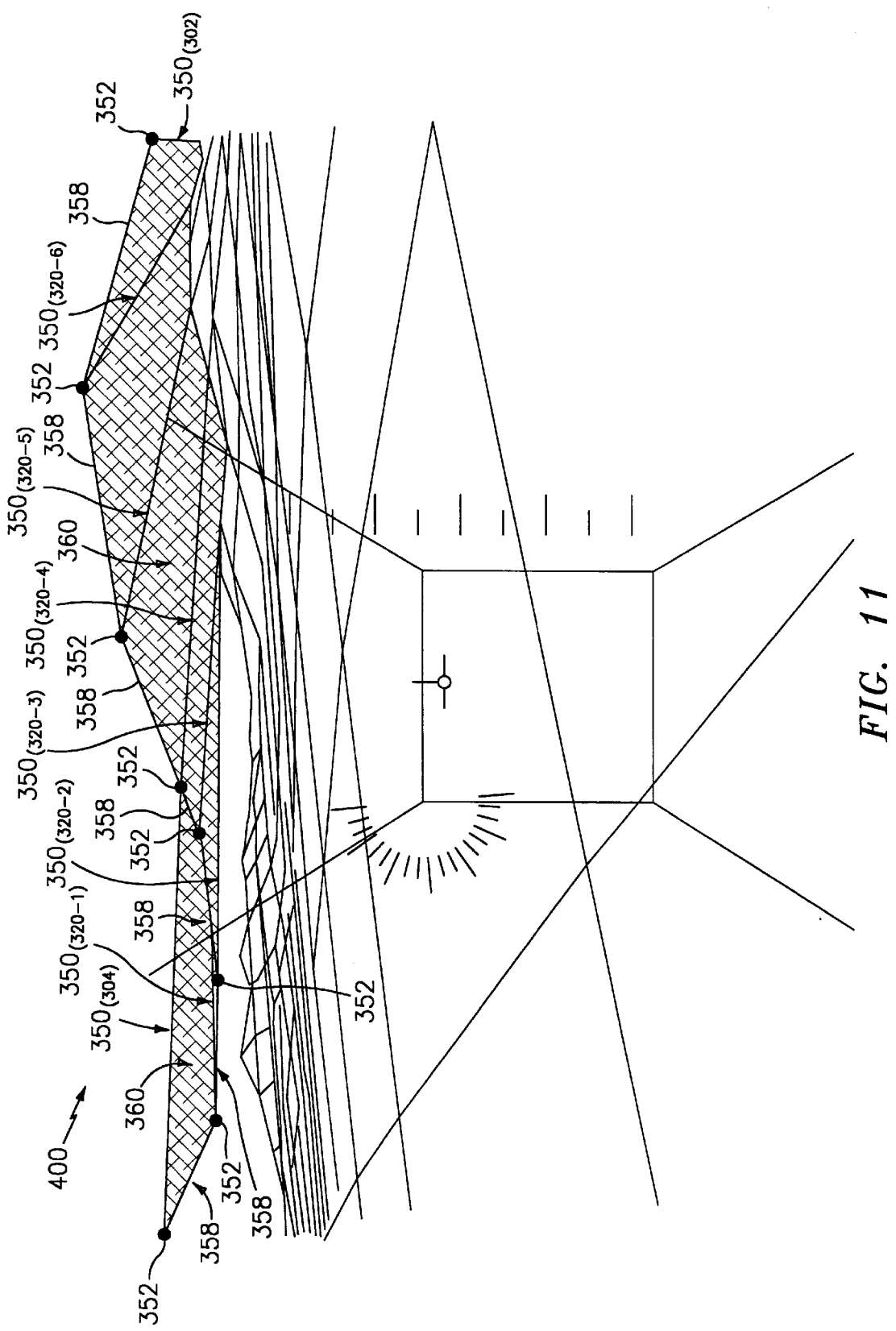
FIG. 11 illustrates a perspective video image of the threat envelope of an identified threat system as viewed from the cockpit of an ownship.

In substep 204E, the PPIC means 100 connects the endpoints 352 of adjacent terrain grazing lines 350 by boundary lines 358 as depicted in FIG. 11 (a view looking out of the cockpit of the ownship). To facilitate a better understanding of FIG. 11, each terrain grazing line 350 includes a subscript that identifies its corresponding terrain profile, i.e., horizontal fan radial 320-N or horizontal perimeter radial 302, 304. For example, terrain grazing line 350$_{(304)}$ identifies the terrain grazing line associated with the horizontal perimeter radial 304, terrain razing line 350$_{(320-4)}$ identifies the terrain grazing line associated with the horizontal fan radial 320-4, etc. The interconnected boundary lines 358 define the outermost edge of the threat envelope for the threat system TS. Adjacent terrain grazing lines 350 and the boundary line 358 interconnecting the endpoints 352 of adjacent terrain grazing lines 350 in combination define a polygon 360 as illustrated in FIG. 11. The set of interconnected polygons 360 associated with the threat system TS define a three-dimensional threat envelope for the threat system TS.

The three-dimensional threat envelope generated in step 204 by the PPIC means 100 is stored in a memory cache, e.g., a high-speed static RAM, in step 206 (see FIG. 6). The relevant elements comprising the three-dimensional threat envelope, as discussed hereinabove, are preferably stored in the memory cache in a digitized coordinate format, e.g., an earth frame of reference, that is compatible with the coordinate reference system utilized by the ownship to facilitate subsequent generation and display of a perspective video image corresponding to the three-dimensional threat envelope.

In step 208, the PPIC means 100 determines whether any portion of the three-dimensional threat envelope is within a system FOV of the ownship. Determining whether any portion of an external object is within the system FOV is known to those skilled in the art as evidenced, for example, by the teachings of U.S. Pat. Nos. 5,296,854 and 5,072,218. The following substeps are effectuated by the PPIC means 100 for this determination.

Figure 6F:
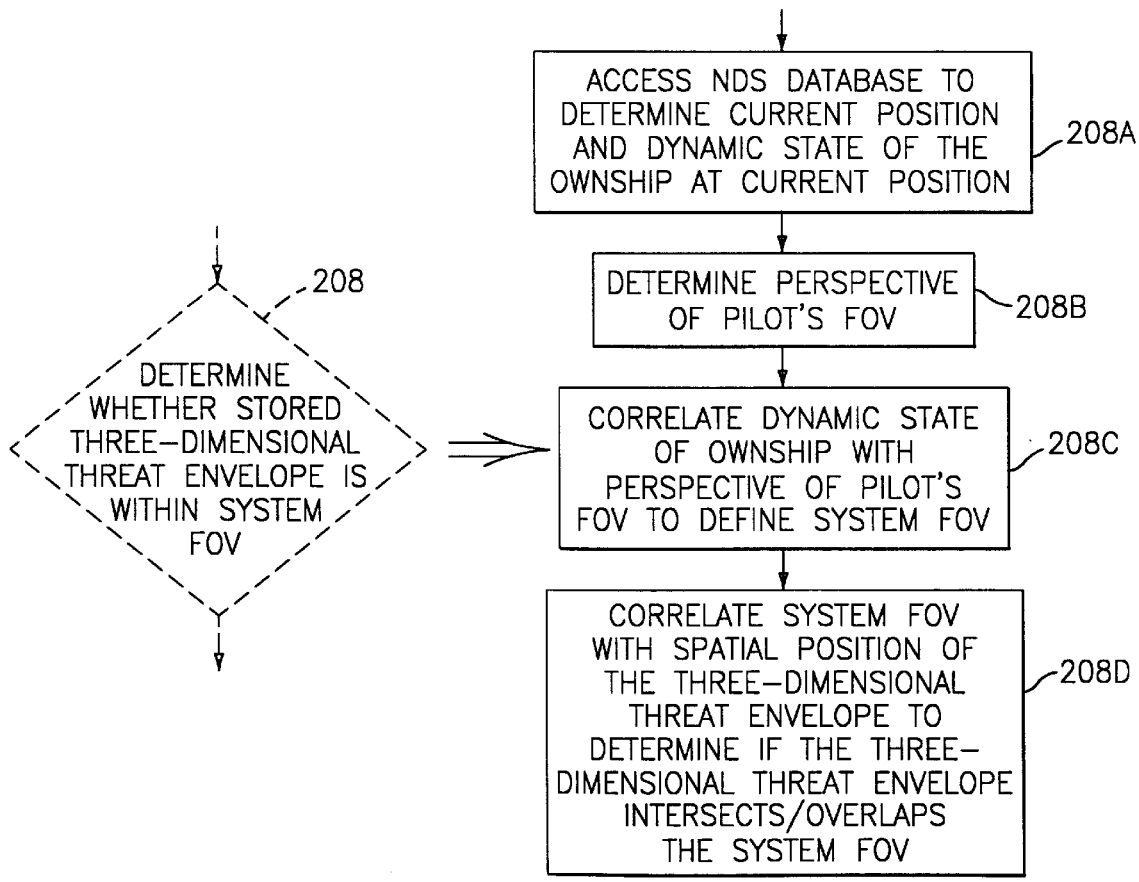
FIG. 6F illustrates exemplary substeps for the determination step of the method illustrated in FIG. 6.

In substep 208A (see FIG. 6F), the PPIC means 100 accesses the NDS database 80 to determine the current position and the dynamic state of the ownship at the current position (this data was previously accessed in substep 202A described hereinabove). In substep 208B, the PPIC means 100 determines the perspective of pilot's FOV, i.e., in relation to the cockpit coordinate system of the ownship (the direction the pilot is looking), based upon attitude/position signals provided by the attitude/position sensing means 40. In substep 208C, the PPIC means 100 correlates the dynamic state of the ownship determined in substep 208A with the perspective of the pilot's FOV as determined in substep 208B to define a system FOV, i.e., in relation to the external environment taking into account the heading and attitude of the ownship in combination with the pilot's FOV. Finally, the PPIC means 100, in substep 208D, correlates the system FOV with the spatial position of the three-dimensional threat envelope, as determined in step 204, to determine whether the system FOV overlaps or intersects any portion of the three-dimensional threat envelope.

Figure 6G:
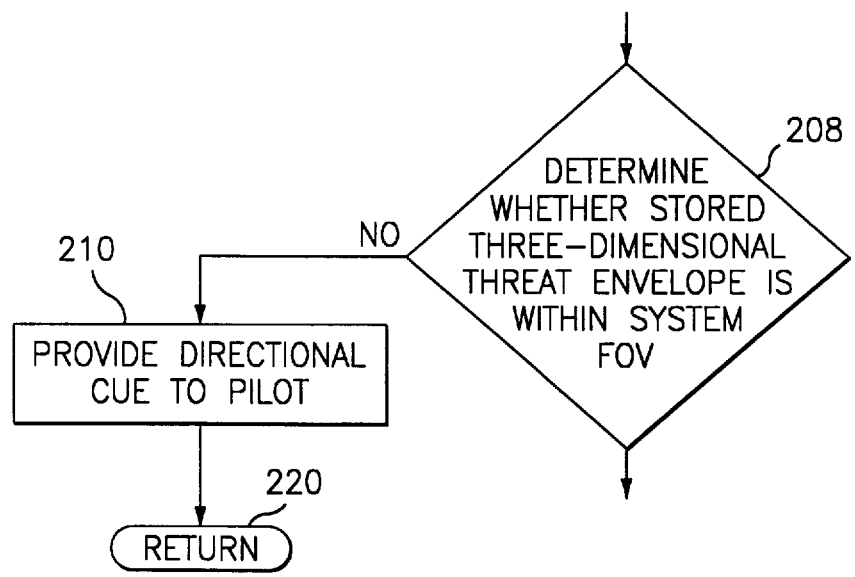
FIG. 6G illustrates an optional step for the method illustrated in FIG. 6.
Figure 6H:
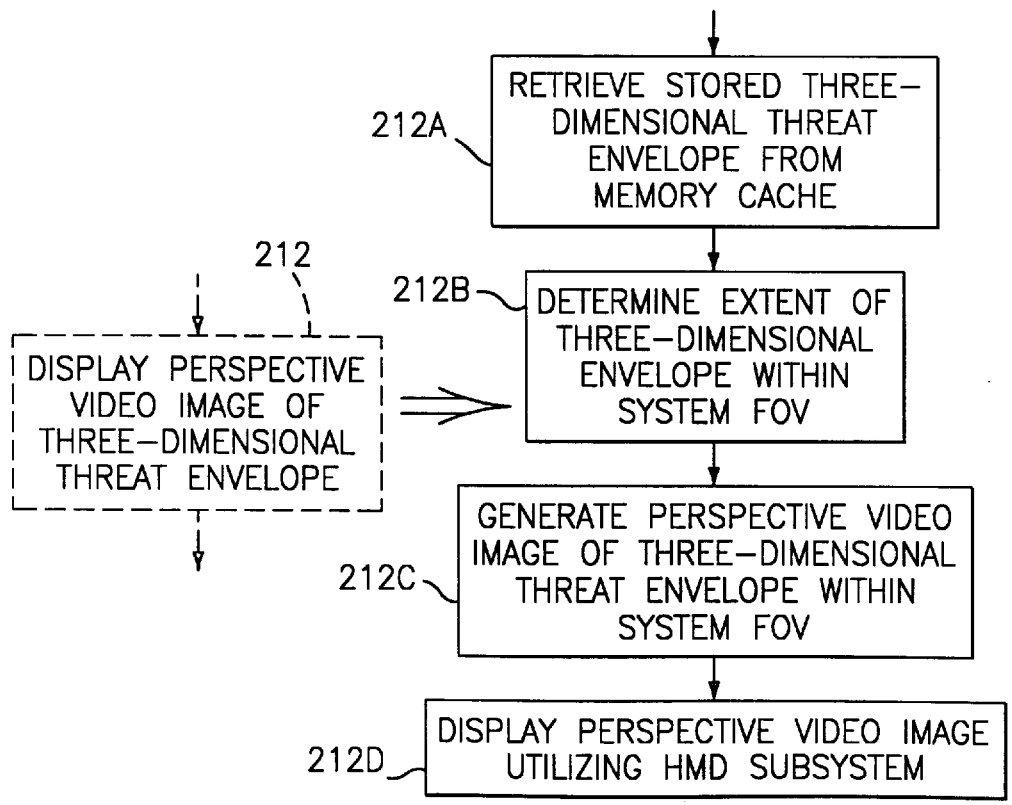
FIG. 6H illustrates exemplary substeps for the display step of the method illustrated in FIG. 6.

If the PPIC means 100 determines that no portion of the three-dimensional threat envelope is within the system FOV, the PPIC means 100 exits the method 200 at step 220 and returns to step 202. Prior to exiting the method 200 at step 220, an optional step 210 may be executed by the PPIC means 100. In optional step 210 (see FIG. 6G), the PPIC means 100 provides a directional cue to the pilot that the system FOV must be changed to bring the three-dimensional threat envelope, or a portion thereof, into view. The directional cue indicates the directional movement required of the system FOV to bring the three-dimensional threat envelope within the visual system of the pilot. As noted in the preceding paragraph, the system FOV is based upon the interrelationship between the ownship dynamic state and the perspective of the pilot's FOV. It should be appreciated, therefore, that the system FOV can be altered by changing the dynamic state of the ownship, changing the attitude and/or position of the pilot's FOV, or a combination thereof. For purposes of the present invention, the directional cue may be a symbol, e.g., a directional arrow, or alphanumeric characters, e.g., a compass heading, that is displayed on the screen 34 of the HMD subsystem 30 to apprise the pilot as to the directional movement (of the ownship, the pilot's FOV, or a combination thereof) required to bring the three-dimensional threat envelope within the system FOV.

If the PPIC means 100 determines that the three-dimensional threat envelope, or some portion thereof, falls within the system FOV, in step 212 (see FIG. 6) the PPIC means 100 displays a perspective video image 400 (see FIG. 11) of the relevant portion of the three-dimensional threat envelope onto the screen 34 of the HMD subsystem 30 for viewing by the pilot. The terminology "perspective" is used herein in its commonplace meaning, to wit, the technique of representing a three-dimensional object on a two-dimensional surface. It should also be understood, however, that the terminology "perspective" can also encompass a three-dimesionsional video image if holographic techniques are used to generate video images of the three-dimensional threat envelopes of identified threat systems.

To effectuate step 212, the PPIC means 100 retrieves, in substep 212A (see FIG. H), the three-dimensional threat envelope stored in the memory cache in step 206. In substep 212B, the PPIC means 100 correlates the spatial orientation of the three-dimensional threat envelope with the system FOV as defined in substep 208C to determine the extent of the three-dimensional threat envelope that is visible in relation to the system FOV. In substep 212C, the PPIC means 100 actuates the special purpose microprocessor 106 to generate a perspective video image that corresponds to the portion of the three-dimensional threat envelope that is visible in relation to the system FOV. The generated perspective video image of the three-dimensional threat envelope is preferably a rendered color image that is created using semi-transparent rendering technology similar to that available on current graphics workstations, e.g., a Silicon Graphics, Inc., workstation. Finally, in substep 212D, the PPIC means 100 displays the perspective video image generated in substep 212C on the screen 34 of the HMD subsystem 30 for viewing by the pilot.

FIG. 11 depicts an exemplary perspective video image 400 of a three-dimensional threat envelope as produced by the VID system 10 and the method 200 according to the present invention. The terrain grazing lines 350 and the boundary lines 358 of the displayed perspective video image 400 of the three-dimensional threat envelope are preferably displayed as solid lines wherein the terrain grazing lines 350 coincide with (overlay) the corresponding actual terrain topography to facilitate pilot cognizance of the perspective video image 400 in relation to the external world. Alternatively, the terrain grazing lines 350 and the boundary lines 358 of the perspective video image 400 may be displayed as dashed or dotted lines. The VID system 10 may be programmed to utilize a predefined standard line format for the representation of the terrain grazing lines 350 and the boundary lines 358 of any perspective video image 400 depending upon the threat range used to create a particular perspective video image 400.

For example, if the displayed perspective video image 400 of the three-dimensional threat envelope is based upon the detection range of the threat system TS, solid lines may be used to represent the terrain grazing lines 350 and the boundary lines 358; if the perspective video image 400 is based upon the acquisition range of the threat system TS, dashed lines may be used to represent the terrain grazing lines 350 and the boundary lines 358; and, if the perspective video image 400 is based upon the intercept range of the threat system TS, dotted lines may be used to represent the terrain grazing lines 350 and the boundary lines 358.

The interconnected polygons 360 of the perspective video image 400 of the three-dimensional threat envelope are preferably displayed as semi-transparent so that the features of the external world are visible to the pilot through the interconnecting polygons 360. As noted above, the perspective video image 400 is displayed as a color image. The VID system 10 may be programmed to utilize a predefined standard color format for the display of the interconnected polygons 360 of any perspective video image 400 depending upon the threat range used to create a particular perspective video image 400.

For example, if the displayed perspective video image 400 of the three-dimensional threat envelope is based upon the detection range of the threat system TS, the interconnected polygons 360 forming the perspective video image 400 may be displayed in yellow; if the displayed perspective video image 400 is based upon the acquisition range of the threat system TS, the interconnected polygons 360 forming the perspective video image 400 may be displayed in orange; and, if the displayed perspective video image 400 is based upon the intercept range of the threat system TS, the interconnected polygons 360 forming the perspective video image 400 may be displayed in red.

The current position of the ownship is constantly changing as the ownship travels along its flight path, and concomitantly, the orientation of the perspective video image 400 of the three-dimensional threat envelope, in relation to the system FOV, is constantly changing. Therefore, in step 216 (see FIG. 6), the PPIC means 100 repeats steps 204, 206, 208, and 212, as required, for each threat system identified in step 202 so that the perspective video image 400 is updated at a predetermined frequency, i.e., the perspective video image 400 displayed in step 212 is a real-time perspective video image 400 of the three-dimensional threat envelope. The PPIC means 100 utilizes a predetermined update frequency for recreating the perspective video image 400 in step 216 that is consonant with the dynamic state of the ownship. That is, as the ownship travels along its flight path, the perspective video images 400 as seen by the pilot are a continuous series (uninterrupted) of video images that provide a continuously changing perspective view of the three-dimensional threat envelope.

For the embodiment of the VID system 10 and method 200 described herein for the ownship H, the PPIC means 100 is operative to provide a predetermined update frequency of 2 Hz, i.e., the PPIC means 100 cycles through the method 200 twice each second for each identified threat system. One skilled in the art will appreciate that the update frequency is a matter of design choice, and depends, inter alia, on the computational power and speed of the PPIC means 100, the dynamic state of the ownship, the number of currently identified threat systems, and the density of the threat systems that will be encountered by the ownship during the mission. However, to continually update the perspective video image 400 of the three-dimensional threat envelope by cycling through steps 204, 206, 208, and 212, as required, is not as computationally intensive as may be imagined since, in most circumstances, the current position $H_C$ of the ownship will become a past position $H_P$ and a short-term projected position $H_F$ will become the current position $H_C$ as the ownship travels along its flight path.

The PPIC means 100 continues to implement step 216 for the identified threat system TS until some point in the ownship's flight path wherein the ownship is no longer within the threat range $D_{fnr}$ of such threat system TS. At this point, the PPIC means 100, at step 208, determines that the three-dimensional threat envelope of such threat system TS is no longer within the system FOV, and as a result, the method 200 is exited at step 220. When the PPIC means 100 implements step 202 after exiting at step 220, such threat system TS is not subsequently "identified" in step 202, and therefore, such threat system TS is effectively dropped from the VID system 10.

With reference to FIG. 11, the displayed perspective video image 400 of the three-dimensional threat envelope and the airspace above the displayed perspective video image 400 effectively identify the threat zone of the threat system TS, i.e., airspace where the ownship is at risk of "detection" by the threat system TS. The risk terminology is used since the threat range $D_{fnr}$ for the threat system TS as defined herein includes the MOS; and therefore, even though the ownship is within the threat range $D_{fnr}$ defined for the threat system TS, the ownship may not necessarily be within the detection range of the threat system TS. In contrast, the airspace below the displayed perspective video image 400 is defined as a safe zone, i.e., the ownship cannot be "detected" by the threat system TS. In discussions herein, reference to the perspective video image 400 should be construed as encompassing the threat zone existing above the perspective video image 400 if the context so requires.

If the ownship is being operated in the threat zone defined by the displayed perspective video image 400 of the three-dimensional threat envelope, the VID system 10 according to the present invention may optionally be operative to provide a warning, e.g., a visual warning by means the HMD subsystem 30, an aural warning, etc., to the ownship pilot in a substep 212E (see FIG. 6I) that the ownship is being operated in a high risk environment. For example, in addition to displaying the perspective video image 400 on the screen 34 of the HMD subsystem 30 in step 212, the PPIC means 100 can be further operative in a substep 212E1 (see FIG. 6J) to concomitantly generate and display a video warning image, e.g., a symbol and/or characters, on the screen 34 of the HMD subsystem 30.

Alternatively, the PPIC means 100 can provide such a warning by displaying the perspective video image 400 of the three-dimensional threat envelope in step 212 in such a manner as to direct the pilot's attention to the displayed perspective video image 400. For example, in a substep 212E2 (see FIG. 6K) the PPIC means 100 would be operative to cyclically alter the intensity of the displayed perspective video image 400, e.g., by flickering, strobing, flashing the displayed perspective video image 400. Or, the VID system 10 can be operative to provide such a warning by displaying the perspective video image 400 in step 212 in a first color, e.g., red, if the ownship is being operated in the threat zone and in a second color, e.g., blue, if the ownship is being operated in the safe zone.

In addition to the optional features described in the immediately preceding paragraphs, the VID system 10 may optionally be further operative to provide the pilot, in substep 212E3 (see FIG. 6L) with a countdown warning with respect to the flight time accrued in the threat zone in relation to the respective response timeline of the threat system TS, thereby affording the pilot with the opportunity to alter the flight path to escape the threat zone prior to expiration of the countdown timer. For example, for the described embodiment of the method 200 implemented by the VID system 10, the threat zone defined by the displayed perspective video image 400 of the three-dimensional threat envelope is based upon the detection range of the threat system TS. Assuming by way of example that the threat system TS is an SA-15 surface-to-air missile system, an examination of FIG. 5B reveals that the detection phase for the SA-15 takes approximately twelve (12) seconds. Thus, if the ownship is operated in the threat zone for less than twelve (12) seconds, there is a reduced probability that the ownship will be detected by the threat system TS. Conversely, if the ownship is operated in the threat zone for more than twelve (12) seconds, there is an increased probability that the ownship has been detected by the threat system TS, thereby increasing the risk to continued operation of the ownship.

To effectuate providing the pilot with such a countdown warning, the PPIC means 100 is operative, in substep 212E3.1 (see FIG. 6M) to determine the current position and dynamic state of the ownship (from substep 202A), the short-term projected flight path of the ownship (from substep 202A), and the coordinates of the three-dimensional threat envelope (from step 206) and calculates a start time that defines the initial entry of the ownship into the threat zone. In substep 213E3.2 the PPIC means 100 accesses the TSC database 70 to determine the appropriate response timeline for the threat system TS. In substep 213E3.3 the PPIC means 100 initiates a countdown timer based upon the appropriate response timeline of the threat system TS. Although the terminology "countdown timer" is used, it should be appreciated that the time can countdown from the response timeline to zero seconds, or alternatively, can count up from zero seconds to the response timeline. In substep 213E3.4 the PPIC means 100 would generate and display a video image of the countdown timer in conjunction with the displayed perspective video image 400 of the three-dimensional threat envelope. Finally, in substep 213E3.5, the PPIC means 100 terminates the countdown timer and simultaneously terminates the displayed video image of the countdown timer. Substep 213E3.5 is implemented when: (i) the response timeline is exceeded; or (ii) the ownship exits the threat zone defined by the displayed perspective video image 400.

If the ownship is being operated in the safe zone defined by the displayed perspective video image 400 of the three-dimensional threat envelope, the VID system 10 of the present invention may optionally be operative, in a substep 212F (see FIG. 6N), to provide the pilot with a visual cue as to the vertical distance between the ownship, the displayed perspective video image 400, and the ground, respectively, thereby affording the pilot with the opportunity to maintain the ownship's flight path within the safe zone. To effectuate providing the pilot with such a visual cue, for example, the PPIC means 100 would be operative in a substep 212F1 (see FIG. 6O) to determine the altitude of the ownship at the current position, the altitude of the displayed perspective video image 400 at the same coordinates, and the mean sea level of the ground at the same coordinates and calculate the vertical differentials therebetween. In a substep 212F2, the PPIC means 100 would be operative to generate and display a numerical video image of such vertical differentials, i.e., between the ownship and the perspective video image 400 and between the ownship and the ground, in conjunction with the displayed perspective video image 400. Alternatively, in a substep 212F2', the PPIC means 100 would be operative to generate and display a symbolic video image of such vertical differentials, e.g., vertical bars (whose length would change as the ownship travels along the flight path), in conjunction with the displayed perspective video image 400.

While the foregoing substeps were described in terms of the ownship being operated in the safe zone, such steps are equally applicable to the operation of the ownship within the threat zone defined by the displayed perspective video image 400 of the three-dimensional threat envelope such that the pilot is afforded the opportunity to alter the flight path of the ownship to escape the threat zone. However, the PPIC means 100 is adaptive in this circumstance to omit calculations with respect to the vertical differential between the ownship and the ground in substep 212F since this vertical differential is irrelevant in this circumstance.

It was disclosed hereinabove in connection with the discussion regarding step 202 of the method 200 that the displayed perspective video image 400 of the three-dimensional threat envelope displayed in step 212 is based upon either the current position of the ownship or the short-term projected flight path of the ownship. If the displayed perspective video image 400 is based upon the short-term projected flight path of the ownship, the current position of the ownship is outside the threat zone defined by the displayed perspective video image 400, but the continued flight of the ownship, based upon its current dynamic state, will bring the ownship into the threat zone defined by the displayed perspective video image 400 in the immediate future (as used in the context of the described embodiment of the method 200, within the next twenty (20) seconds). In this circumstance, the VID system 10 according to the present invention may be optionally operative, in a substep 212G (see FIG. 6P), to provide the pilot with a parametric visual cue as to when the ownship will enter the threat zone defined by the displayed perspective video image 400. To provide the pilot with such a parametric visual cue, the PPIC means 100 would be operative, in a substep 212G1 (see FIG. 6A), to determine the current position and dynamic state of the ownship (from substep 202A), the short-term projected flight path of the ownship (from substep 202A), and the coordinates of the three-dimensional threat envelope (from step 206) and calculate the point of intersection of the short-term projected flight path of the ownship with the displayed perspective video image 400. In a substep 212G2 the PPIC means 100 would be operative to calculate a non-steady state parameter, i.e., either a distance or a time, that defines the relationship between the calculated point of intersection and the current position of the ownship. The parameter has a non-steady state in the sense that, as the ownship travels along the short-term projected flight path, the numerical value of the parameter continually decreases towards a value of zero. Finally, in a substep 212G3, the PPIC means 100 would be operative to generate and display a video image representative of the parameter, e.g., a numerical value of time or distance or a symbol such as a bar representing time or distance, in conjunction with the displayed perspective video image 400.

The method 200 according to the present invention was described hereinabove in terms of a single threat range (for the purposes of the foregoing description, the threat range was based upon the detection range of an exemplary threat system TS). One skilled in the art will appreciate that the VID system 10 according to the present invention can alternatively be operative to simultaneously display two perspective video images of two three-dimensional threat envelopes by utilizing two threat ranges (based upon two of the three ranges defined for the threat system TS: the detection range; the acquisition range; and the intercept range) or to simultaneously display three perspective video images of three three-dimensional threat envelopes (based upon the detection range, the acquisition range, and the intercept range) for each threat system TS identified in step 202 of the method 200.

Figure 6R:
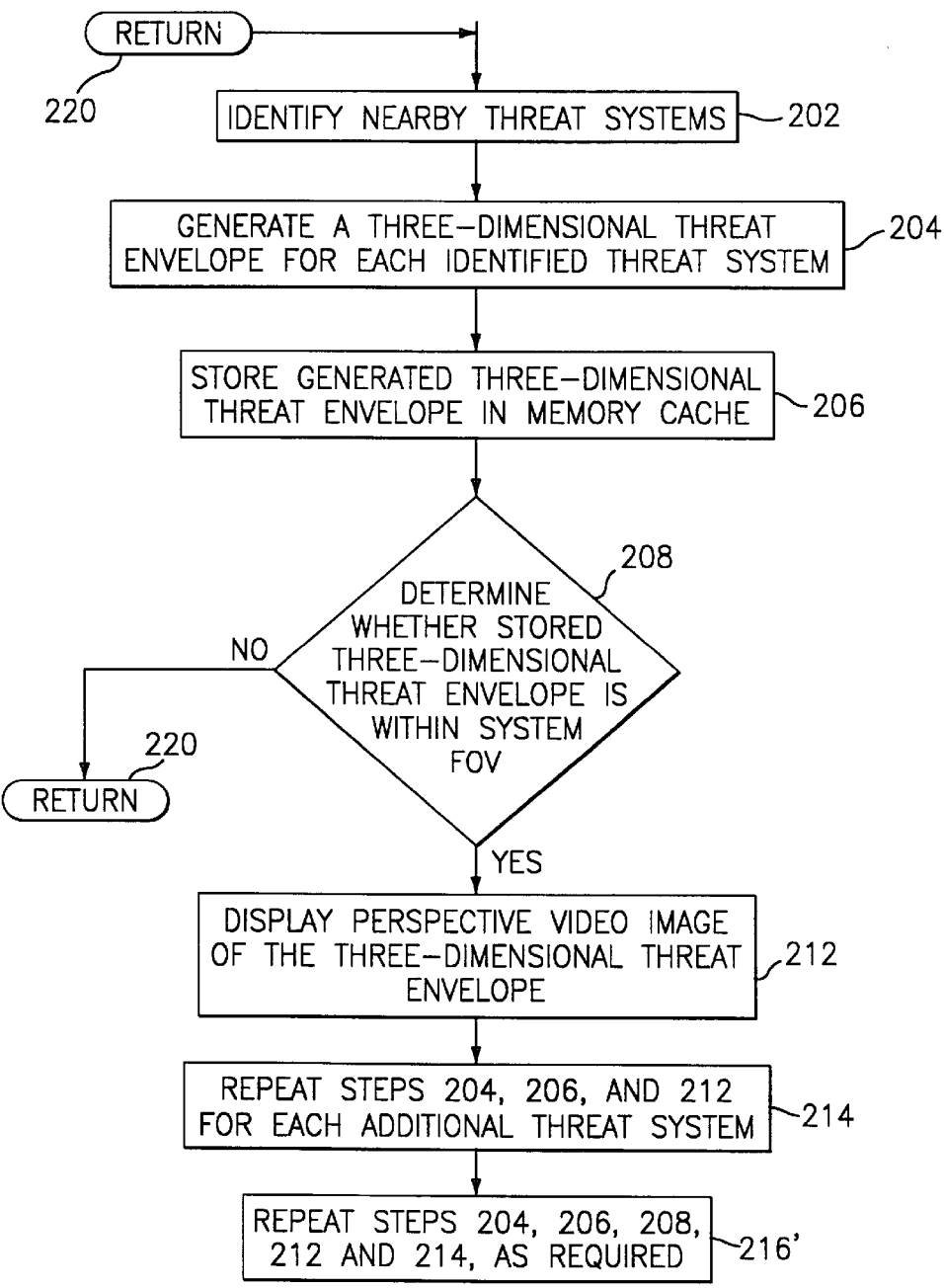
FIG. 6R illustrates another embodiment of a method according to the present invention for identifying nearby threat systems, for generating multiple real-time three-dimensional threat envelopes of identified threat systems, and for simultaneously displaying multiple real-time perspective video images of such threat envelopes for viewing by the pilot.

In this alternative embodiment, which is illustrated in FIG. 6R, the method 200 further includes a step 214 wherein the PPIC means 100 is further operative to repeat steps 204, 206, and 212 for each additional threat range of the identified threat system TS before executing a step 216'. The step 216' is a derivative of the step 216 described hereinabove that comprises repeating steps 204, 206, 208, 212, and 214, as required. In step 212 of this alternative embodiment of the method 200, two or three perspective video images of the corresponding three-dimensional threat envelopes will be simultaneously displayed for viewing by the pilot.

There will be a certain degree of overlap between the simultaneously displayed perspective video images depending upon the threat ranges utilized. For example, a displayed perspective video image of a three-dimensional threat envelope based upon the detection range will completely overlap the displayed perspective video image(s) of the three-dimensional threat envelope(s) based upon the acquisition range and/or the intercept range. Similarly, a displayed perspective video image of a three-dimensional threat envelope based upon the acquisition range will completely overlap the displayed perspective video image of the three-dimensional threat envelope based upon the intercept range.

Therefore, the PPIC means 100 would preferably be operative in step 212 of this alternative embodiment of the method 200 to provide visual differentiation between each of the simultaneously displayed perspective video images in a manner similar to that previously described hereinabove. For example, the terrain grazing lines and boundary lines defining the first displayed perspective video image would be rendered in a first line format, e.g., solid lines, the terrain grazing lines and boundary lines defining the second displayed perspective video image would be rendered in a second line format, e.g., dashed lines, and, if required, the terrain grazing lines and boundary lines defining the third displayed perspective video image would be rendered in a third line format, e.g., dotted lines. Alternatively, the interconnected polygons defining the first displayed perspective video image could be rendered in a first color, e.g., red, the interconnected polygons defining the second displayed perspective video image could be displayed in a second color, e.g., yellow, and, if required, the interconnected polygons defining the third displayed perspective video image could be rendered in a third color, e.g., orange. It will be appreciated that the foregoing visual differentiation schemes for the simultaneously displayed perspective video images could also be used in combination.

It was disclosed hereinabove in connection with substep 204A1 that if the angular sum $(\theta_{310}+\theta_{312})$ is equal to zero, then the flight path of the ownship is directly towards the threat system TS, i.e., the flight path coincides with a radial emanating from the threat system TS. In this unusual condition (which may occur, for example, if the ownship has been tasked to eliminate the threat system TS or the only feasible flight path for the ownship, based upon the mission parameters, is directly over the threat system TS), the VID system 10 according to the present invention is adaptive to recognize this unusual condition and to generate a special three-dimensional threat envelope based upon this condition.

Figure 12:
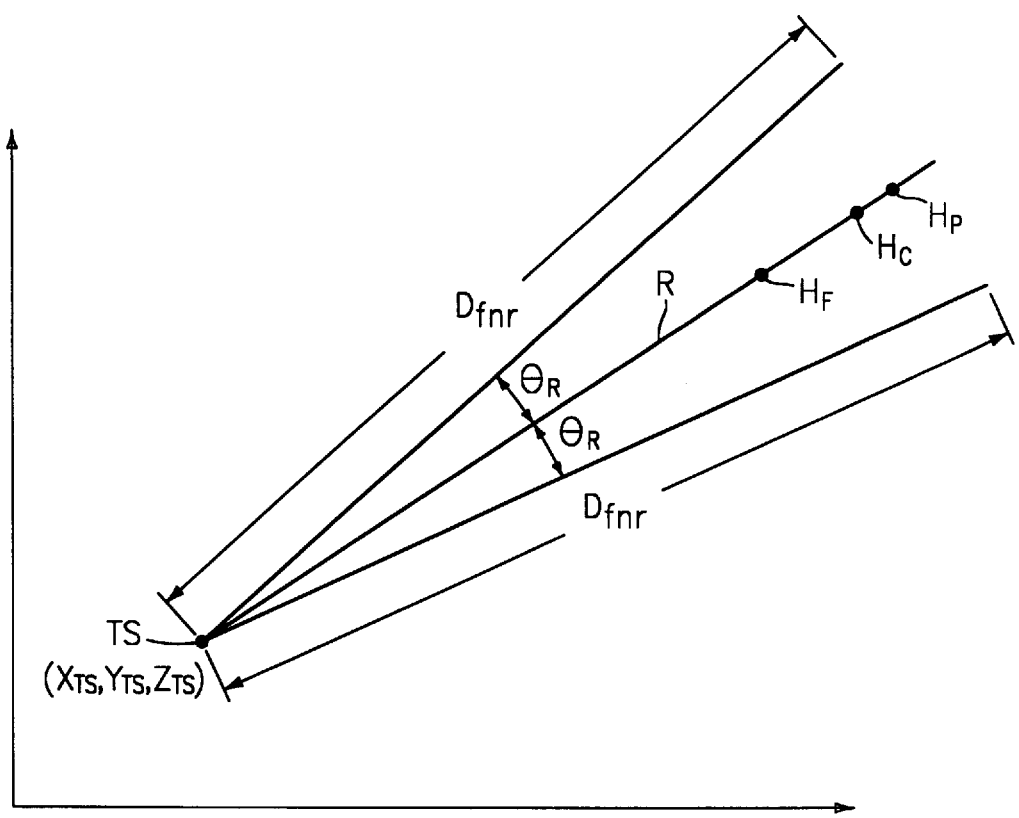
FIG. 12 is a two-dimensional plan view, looking downward, of the position of a threat system and the ownship flight path projected on a horizontal plane that illustrates the threat envelope of such threat system generated by the method depicted in FIG. 6 when the ownship is flying directly towards the threat system along the radial R emanating from the threat system.

If the PPIC means 100 determines in substep 204A1 that the current position $H_C$ of the ownship, the past position $H_P$ of the ownship, and a short-term projected position $H_F$ of the ownship coincide with a radial R emanating from the identified threat system TS, then the PPIC means 100 implements substeps 204A1.1, 204A1.2. In substep 204A1.1 the PPIC means 100 defines a dynamic half-angle $\theta_R$ with respect to the radial R that the ownship is flying along as illustrated in FIG. 12. The dynamic half-angle $\theta_R$ is a design factor based upon, inter alia, the distance of the ownship from the identified threat system TS and the dynamic state of the ownship. The PPIC means 100 is operative in substep 204A1.2 to calculate the first and second horizontal perimeter radials 302, 304 such that the first and second horizontal perimeter radials 302, 304 are symmetrically disposed about the radial R by the dynamic half-angle $\theta_R$. The remaining steps of the method 200, as described hereinabove, are substantially the same for the embodiment of the method 200 for this unusual condition. As the step 204 is repeated as a result of the PPIC means 100 implementing the step 216, in substep 204A1.1 the dynamic half-angle $\theta_R$ is incrementally increased by a predetermined amount, based upon, inter alia, the distance of the ownship from the threat system TS and the dynamic state of the ownship, in each iteration so that the displayed perspective video images of the three-dimensional threat envelope embody a usable lateral scope.

Figure 6S:
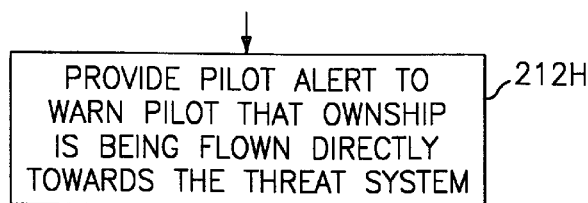
FIG. 6S illustrates an optional substep for the method illustrated in FIG. 6.

As described hereinabove, in the substep 212 of the method 200 the PPIC means 100 displays a perspective video image of the three-dimensional threat envelope onto the screen 34 of the HMD subsystem 30 for viewing by the pilot. Since the unusual condition described in the preceding paragraph may be aptly characterized as an extremely high risk situation for the ownship, the PPIC means 100 is preferably optionally operative to generate a pilot alert in a substep 212H (see FIG. 6S) that warns the pilot that the ownship is being flown directly towards the threat system TS. The pilot alert can be presented as an aural warning tone, a video warning image, or a combination thereof. For example, the PPIC means 100 in substep 212H could be operative to generate and display a video image of a solid-colored circle, e.g., red, having an "X" inlaid therein (similar to a universal warning sign), with the circle centered with respect to the radial R. Further, the PPIC means 100 could be operative to display the video image of the solid-colored circle in a pulsating manner to enhance the visual stimulation provided thereby.

A variety of modifications and variations of the present invention are possible in light of the above teachings. It is therefore to be understood that, within the scope of the appended claims, the present invention may be practiced otherwise than as specifically described hereinabove.

What is claimed is:

1. A virtual image display system for an ownship for identifying each threat system nearby a flight path of the ownship when the ownship is within a threat range of such threat system, for generating a three-dimensional threat envelope for each identified threat system, and for displaying real-time perspective video images of such three-dimensional threat envelope for viewing by a pilot of the ownship, comprising:

a video display subsystem for generating and displaying video images to the ownship pilot;

means for sensing the attitude and position of the head of the ownship pilot in relation to an ownship cockpit coordinate system;

a digital terrain database for providing topographical data and information with respect to terrain proximal the flight path of the ownship;

database means for providing geographical coordinate, elevation, and characteristics data with respect to threat systems proximal the flight path of the ownship;

database means for providing navigational data and dynamic state information with respect to the ownship; and computer processing means functionally interconnected to said threat systems database means and said navigational data/dynamic state information database means and operative for identifying each threat system nearby the flight path of the ownship when the ownship is within a threat range of the threat system, wherein said computer processing means is operative to identify the threat system by determining a current position and a short-term projected flight path of the ownship, by correlating said current position and said short-term projected flight path of the ownship with geographical coordinates of the threat system to determine whether the threat system is proximal said current position and said short-term projected flight path of the ownship, and determining whether the ownship is within the threat range of the threat system;

said computer processing means being functionally interconnected to said video display subsystem, said attitude/position sensing means, said digital terrain database, said threat systems database means, and said navigational data/dynamic state database means and operative for generating a three-dimensional threat envelope for said identified threat system, wherein said computer processing means is operative to generate said three-dimensional threat envelope for said identified threat system by defining a two-dimensional plan view of said three-dimensional threat envelope, by defining terrain profiles for said two-dimensional plan view, by identifying a terrain profile grazing line for each of said terrain profiles, by defining an endpoint for each said terrain grazing profile, and by connecting said endpoints of adjacent ones of said terrain grazing lines by a boundary line wherein said terrain grazing lines and said boundary lines in combination form a set of interconnected polygons emanating from said identified threat system that define said three-dimensional threat envelope;

said computer processing means being functionally interconnected to said video display subsystem, said attitude/position sensing means, said digital terrain database, said threat systems database means, and said navigational data/dynamic state database means and operative for displaying real-time perspective video images of each said generated three-dimensional threat envelope for viewing by the ownship pilot.

2. The virtual image display system of claim 1 wherein said video display subsystem is a helmet-mounted display subsystem.

3. The virtual image display system of claim 1 wherein said threat systems database means comprises:
   a threat systems database for providing geographical coordinate and elevation data of said threat systems proximal the flight path of the ownship; and
   a threat systems characteristics database for providing data regarding functional characteristics of said threat systems proximal the flight path of the ownship.

4. The virtual image display system of claim 1 further comprising virtual imaging means for generating virtual images of the external world proximal the flight path of the ownship, and wherein said computer processing means is functionally interconnected to said virtual imaging means and operative to convert said virtual images to video images and to display said video images of said virtual images for viewing by the ownship pilot by means of said video display subsystem.

5. A method for providing threat information to a pilot of an ownship flying a flight path by means of a video display subsystem, comprising the steps of:
   (202) identifying each threat system proximal the flight path of the ownship when the ownship is within a threat range of the threat system, said threat system identification step includes the substeps of
      (202A) determining a current position and a short-term projected flight path of the ownship,
      (202B) correlating said current position and said short-term projected flight path of the ownship with geographical coordinates of the threat system to determine whether the threat system is proximal said current position and said short-term projected flight path of the ownship; and
      (202C) determining whether the ownship is within the threat range of the threat system;
   (204) generating a three-dimensional threat envelope of each said identified threat system, said three-dimensional threat envelope generating step including the substep of
      (204A) defining a two-dimensional plan view of said three-dimensional threat envelope,
      (204B) defining terrain profiles for said two-dimensional plan view,
      (204C) identifying a terrain grazing line for each of said terrain profiles,
      (204D) defining an endpoint for each said terrain grazing profile, and
      (204E) connecting said endpoints of adjacent terrain grazing lines by a boundary line wherein said terrain grazing lines and said boundary lines in combination form a set of interconnected polygons emanating from said identified threat system that define said three-dimensional threat envelope;
   (206) storing each said generated three-dimensional threat envelope in a computer memory cache;
   (208) determining, for each said stored three-dimensional threat envelope, whether any portion thereof is within a system field of view of the ownship;
   (220) returning to step (202) if it is determined in step (208) that no portion of said three-dimensional threat envelope is within said system field of view;
   (212) displaying a perspective video image of said portion of said three-dimensional threat envelope for viewing by the pilot of the ownship by means of the video display subsystem; and
   (216) repeating steps (204), (206), (208), and (212) as required to display a continuous series of real-time perspective video images of said threat envelope for viewing by the pilot of the ownship by means of the video display subsystem.

6. The method of claim 1 wherein said substep (204A) of defining said two-dimensional plan view of said three-dimensional threat envelope further comprises the substeps of:
   (204A1) calculating first and second horizontal perimeter radials; and
   (204A2) defining a plurality of horizontal fan radials between said first and second horizontal perimeter radials, said first and second horizontal perimeter radials and said plurality of horizontal fan radials in combination defining said two-dimensional plan view of three-dimensional threat envelope.

7. The method of claim 6 wherein said substep (204B) of defining said terrain profiles further comprises the substeps of:
   (204B1) calculating azimuth angles for each of said first and second horizontal perimeter radials and each of said plurality of horizontal fan radials;
   (204B2) subdividing each of said first and second horizontal perimeter radials and each of said plurality of horizontal fan radials into a plurality of segments;
   (204B3) identifying unique localities for each of said first and second horizontal perimeter radials and each of said plurality of horizontal fan radials based upon said corresponding plurality of segments;
   (204B4) identifying polar coordinates for each said unique locality and transforming said polar coordinates of each said unique locality to rectangular coordinates;
   (204B5) correlating said rectangular coordinates of each said unique locality with topographical data from a digital terrain database to determine a terrain elevation for each said unique locality; and
   (204B6) creating a terrain profile matrix for each of said first and second horizontal perimeter radials and each of said plurality of horizontal fan radials wherein each said terrain profile matrix defines one said terrain profile.

8. The method of claim 7 wherein said substep (204C) of identifying said terrain grazing line for each said terrain profile comprises the substeps of:
   (204C1) calculating a ratio for each entry in each said terrain profile matrix;
   (204C2) determining a critical ratio for each said terrain profile matrix; and
   (204C3) defining said terrain grazing line for each said terrain profile based upon said critical ratio of each said corresponding terrain profile matrix.

9. The method of claim 5 wherein said step (208) of determining whether any portion of said stored three-dimensional image of said threat envelope is within the field of view of the pilot comprises the substeps of:
   (208A) determining a current position and dynamic state of the ownship;

(208B) determining a field of view of the pilot in relation to a cockpit coordinate system of the ownship based upon signals provided by an attitude/position sensing apparatus;

(208C) correlating said current position and dynamic of the ownship with said field of view of the pilot to determine said system field of view; and (208D) correlating said system field of view with spatial coordinates of said stored three-dimensional threat envelope to determine if any portion of said three-dimensional threat envelope is within said system field of view.

10. The method of claim 9 further comprising a step (210) of:

providing, prior to returning to step (202) in step (220), a directional cue to the pilot of the ownship as to directional movement required to bring said three-dimensional threat envelope within the system FOV.

11. The method of claim 9 wherein said step (212) of displaying said perspective video image of said portion of said three-dimensional threat envelope comprises the substeps of:

(212A) retrieving said three-dimensional threat envelope stored in step (206);

(212B) correlating said spatial coordinates of said three-dimensional threat envelope with said system field of view to determine what portion of said three-dimensional threat envelope is visible to the pilot of the ownship;

(212C) generating said perspective video image corresponding to said portion of said three-dimensional threat envelope that is visible to the pilot of the ownship; and (212D) displaying, by means of the video display subsystem, said generated perspective video image of said three-dimensional threat envelope for viewing by the pilot of the ownship.

12. The method of claim 11 further comprising a substep (212E) of providing a warning to the ownship pilot that the ownship is being operated in a threat zone defined by said displayed perspective video image of said three-dimensional threat envelope.

13. The method of claim 12 wherein said substep (212E) of providing said warning to the ownship pilot comprises a substep (212E1) of displaying a video warning image in conjunction with said displayed perspective video image of said three-dimensional threat envelope.

14. The method of claim 12 wherein said substep (212E) of providing said warning to the ownship pilot comprises a substep (212E2) of cyclically altering the intensity of said displayed perspective video image of said three-dimensional threat envelope.

15. The method of claim 12 wherein said substep (212E) of providing said warning to the ownship pilot comprises a substep (212E3) of coloring said displayed perspective video image of said three-dimensional threat envelope in a first color if said ownship is being operated in the threat zone defined by said displayed perspective video image of said three-dimensional threat envelope and coloring said displayed perspective video image of said three-dimensional threat envelope in a second color if said ownship is being operated in a safe zone defined by said displayed perspective video image of said three-dimensional threat envelope.

16. The method of claim 11 further comprising a substep (212E3) of providing a countdown warning to the ownship pilot with respect to flight time accrued in a threat zone defined by said displayed perspective video image of said three-dimensional threat envelope in relation to a response timeline of the threat system.

17. The method of claim 16 wherein said substep (212E3) of providing said countdown warning further comprises the substeps of:

(212E3.1) determining the current position and dynamic state of the ownship at the current position; the short-term projected flight path of the ownship, and the coordinates of said three-dimensional threat envelope and calculating a start time that defines an initial entry of the ownship into the threat zone;

(212E3.2) accessing a threat systems characteristics database to determine said response timeline of the threat system;

(212E3.3) initiating a countdown timer based upon the said response timeline of the threat system;

(212E3.4) generating and displaying a video image representative of said countdown timer in conjunction with said displayed perspective video image of said three-dimensional threat envelope; and (212E3.5) terminating said countdown timer and simultaneously terminating said displayed video image of said countdown timer.

18. The method of claim 11 further comprising a substep (212F) of providing the pilot with a visual cue as to at least one vertical differential between the ownship, the ground, and said displayed perspective video image of said three-dimensional threat envelope.

19. The method of claim 18 wherein said substep (212F) of providing the pilot with said visual cue comprises the substeps of:

(212F1) determining an altitude of the ownship at the current position of the ownship, determining the mean sea level of said ground at equivalent coordinates, determining an altitude of said displayed perspective video image of said three-dimensional threat envelope at equivalent coordinates, and calculating vertical differentials between said ownship and said ground and said ownship and said displayed perspective video image of said three-dimensional threat envelope, as required; and (212F2) generating and displaying a numerical video image of each said vertical differential in conjunction with said displayed perspective video image of said three-dimensional threat envelope.

20. The method of claim 18 wherein said substep (212F) of providing the pilot with said visual cue comprises the substeps of:

(212F1) determining an altitude of the ownship at the current position of the ownship, determining the mean sea level of said ground at equivalent coordinates, determining an altitude of said displayed perspective video image of said three-dimensional threat envelope at equivalent coordinates, and calculating vertical differentials between said ownship and said ground and said ownship and said displayed perspective video image of said three-dimensional threat envelope, as required; and (212F2) generating and displaying a symbolic video image representative of each said vertical differential in conjunction with said displayed perspective video image of said three-dimensional threat envelope.

21. The method of claim 11 further comprising the substep (212G) of providing the pilot with a parametric visual cue as to when the ownship will enter a threat zone defined by the displayed perspective video image of the three-dimensional threat envelope.

22. The method of claim 21 wherein said substep (212G) of providing the pilot with said parametric visual cue includes the substeps of:

(212G1) determining the current position and dynamic state of the ownship at the current position, the short-term projected flight path of the ownship, and coordinates of said three-dimensional threat envelope and calculating a point of intersection of the short-term projected flight path of the ownship with said three-dimensional threat envelope;

(212G2) calculating a non-steady state parameter representative of the relationship between said point of intersection and the current position of the ownship; and (212G3) generating and displaying a video image of said non-steady state parameter as said parametric visual cue in conjunction with said displayed perspective video image of said three-dimensional threat envelope.

23. The method of claim 5 further comprising the step of:

(214) repeating steps 204, 206 and 212 for each additional threat range of each said identified threat system; and wherein said step (216) repeats step 214.

24. The method of claim 5 further comprising the substep (212H) of providing a pilot alert to warn the pilot that the ownship is being flown directly towards said identified threat system.

* * * * *